(12) United States Patent
Kang et al.

(10) Patent No.: US 11,471,810 B2
(45) Date of Patent: Oct. 18, 2022

(54) AIR PURIFIER

(71) Applicants: LG ELECTRONICS INC., Seoul (KR); CHUNGANG UNIVERSITY INDUSTRY ACADEMIC COOPERATION FOUNDATION, Seoul (KR)

(72) Inventors: Jiyoung Kang, Seoul (KR); Haeyoong Chung, Seoul (KR); Jongkeon Jeon, Seoul (KR); David Kangseong Lee, Seoul (KR); Daeyoung Kwak, Seoul (KR); Sohee Park, Seoul (KR)

(73) Assignees: LG ELECTRONICS INC., Seoul (KR); CHUNGANG UNIVERSITY INDUSTRY ACADEMIC COOPERATION FOUNDATION, Seoul (KR)

( * ) Notice: Subject to any disclaimer, the term of this patent is extended or adjusted under 35 U.S.C. 154(b) by 297 days.

(21) Appl. No.: 16/815,506

(22) Filed: Mar. 11, 2020

(65) Prior Publication Data
US 2020/0298165 A1 Sep. 24, 2020

(30) Foreign Application Priority Data

Mar. 19, 2019 (KR) .................. 10-2019-0031436
Jul. 29, 2019 (KR) .................. 10-2019-0091564

(51) Int. Cl.
*B01D 46/24* (2006.01)
*B01D 46/00* (2022.01)

(52) U.S. Cl.
CPC ......... *B01D 46/24* (2013.01); *B01D 46/0005* (2013.01); *B01D 46/0043* (2013.01)

(58) Field of Classification Search
CPC .. F24F 8/10; F24F 8/108; F24F 1/0071; F24F 1/0073; B01D 46/24; B01D 46/2403;
(Continued)

(56) References Cited

U.S. PATENT DOCUMENTS

| 4,488,888 A | 12/1984 | Doyle |
| 10,508,658 B2 | 12/2019 | Park et al. |

(Continued)

FOREIGN PATENT DOCUMENTS

| CN | 1510349 | 7/2004 |
| CN | 1727774 | 2/2006 |

(Continued)

OTHER PUBLICATIONS

Machine translation of CN 107975878 (Year: 2018).*
(Continued)

*Primary Examiner* — Robert Clemente
(74) *Attorney, Agent, or Firm* — KED & Associates, LLP

(57) ABSTRACT

An air purifier includes a filter, a fan to suction air through the filter, a first case configured to cover the filter and the fan, and a second case overlapping with the first case. The first and second cases may be moveable in a vertical direction such that the second case may be raised to lengthen the air purifier and the first case may be raised to expose the filter for replacement. The second case may be provided outside of the first case and have a side discharge grill and a top discharge grill, which may each be selectively opened and closed.

19 Claims, 18 Drawing Sheets

(58) Field of Classification Search
CPC ............ B01D 46/0005; B01D 46/0043; B01D 46/62; B01D 46/64; B01D 46/0002; B01D 46/0004; B01D 46/0049; B01D 46/58; B01D 46/60; B01D 46/442; B01D 2267/60; B01D 2279/50
See application file for complete search history.

(56) References Cited

U.S. PATENT DOCUMENTS

| | | | |
|---|---|---|---|
| 2004/0118289 | A1 | 6/2004 | Chang et al. |
| 2005/0268583 | A1 | 12/2005 | Han et al. |
| 2017/0246581 | A1 | 8/2017 | Jung et al. |
| 2017/0360980 | A1 | 12/2017 | Jakins |
| 2018/0264157 | A1 | 9/2018 | Benedek |
| 2019/0331137 | A1 | 10/2019 | Xiao |

FOREIGN PATENT DOCUMENTS

| | | |
|---|---|---|
| CN | 201662192 | 12/2010 |
| CN | 102221241 | 10/2011 |
| CN | 204519811 | 8/2015 |
| CN | 204687868 | 10/2015 |
| CN | 105333528 | 2/2016 |
| CN | 105571104 | 5/2016 |
| CN | 205619461 | 10/2016 |
| CN | 106290967 | 1/2017 |
| CN | 106 422 551 | 2/2017 |
| CN | 106765653 | 5/2017 |
| CN | 106871249 | 6/2017 |
| CN | 106940078 | 7/2017 |
| CN | 206377768 | 8/2017 |
| CN | 206929937 | 1/2018 |
| CN | 107763750 | 3/2018 |
| CN | 107763754 | 3/2018 |
| CN | 107975878 | 5/2018 |
| CN | 207395002 | 5/2018 |
| CN | 108111060 | 6/2018 |
| CN | 108626867 | 10/2018 |
| CN | 108800333 | 11/2018 |
| CN | 208222678 | 12/2018 |
| CN | 208296183 | 12/2018 |
| CN | 109340945 | 2/2019 |
| EP | 1 437 169 | 7/2004 |
| EP | 3 211 345 | 8/2017 |
| JP | S53-159152 | 12/1978 |
| JP | H09-178259 | 7/1997 |
| JP | 2005-288327 | 10/2005 |
| JP | 2011-106788 | 6/2011 |
| KR | 10-2006-0112758 | 11/2006 |
| KR | 10-0933634 | 12/2009 |
| KR | 10-2017-0044542 | 4/2017 |
| KR | 10-2017-0044543 | 4/2017 |
| KR | 10-2026194 | 11/2019 |
| WO | WO 2013/176213 | 11/2013 |
| WO | WO 2017/074128 | 5/2017 |
| WO | WO 2018/110730 | 6/2018 |

OTHER PUBLICATIONS

Machine translation of CN 108800333 (Year: 2018).*
European Search Report dated Aug. 20, 2020 issued in Application No. 20164336.8.
European Search Report dated Aug. 12, 2020 issued in EP Application No. 20163817.8.
European Search Report dated Aug. 12, 2020 issued in EP Application No. 20163887.1.
Chinese Office Action issued in Application No. 202010175621.9 dated Jan. 6, 2022.
Chinese Office Action issued in Application No. 2021052802933960 dated Jun. 2, 2021.
Chinese Office Action dated Jun. 3, 2021 issued in Application No. 202010185182.X.
U.S. Office Action dated Feb. 11, 2022 issued in U.S. Appl. No. 16/815,573.
U.S. Appl. No. 16/815,573, filed Mar. 11, 2020.
Chinese Office Action dated Apr. 6, 2021 issued in Application No. 202010175621.9.
European Office Action dated Mar. 1, 2022 issued in EP Application No. 20164336.8.
U.S. Office Action dated Aug. 25, 2022 issued in U.S. Appl. No. 16/815,663.
U.S. Appl. No. 16/815,506, filed Mar. 11, 2020.
U.S. Appl. No. 16/815,663, filed Mar. 11, 2020.

* cited by examiner

AIR PURIFIER

CROSS-REFERENCE TO RELATED APPLICATION(S)

This application claims priority under 35 U.S.C. § 119 to Korean Application Nos. 10-2019-0031436 filed on Mar. 19, 2019, and 10-2019-0091564, filed on Jul. 29, 2019, whose entire disclosures are hereby incorporated by reference.

BACKGROUND

1. Field

An air purifier is disclosed herein.

2. Background

An air purifier or cleaner may be a device that suctions contaminated air, purifiers the suctioned air, and then discharges the purified air. The air purifier may include a fan to suction ambient or outside air into an interior of the air purifier and a filter to filter dust, germs, and other foreign matter in the air. Generally, an air purifier is configured to purify an interior or indoor space such as a home or office.

Since the air purifier may have a fixed position in a room, an area capable of being purified by the air purifier may be limited depending on how air is discharged. Korean Registration No. 10-0933634 discloses an air purifier having an interior main body that is lifted up and down to purify air. When the main body is moved upward, air surrounding an upper side of the air purifier may be purified. When the main body is moved downward, air surrounding a lower side of the air purifier may be purified.

However, an operation of the air purifier of Korean Registration No. 10-0933634 may be restricted to upper and lower portions, limiting usability. The suction inlet or grill and discharge outlet or grill are provided on lateral surfaces of the main body, so air may not be blown upward or downward and is rather limited Clean or purified air therefore may not be easily supplied to a region above the air purifier.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
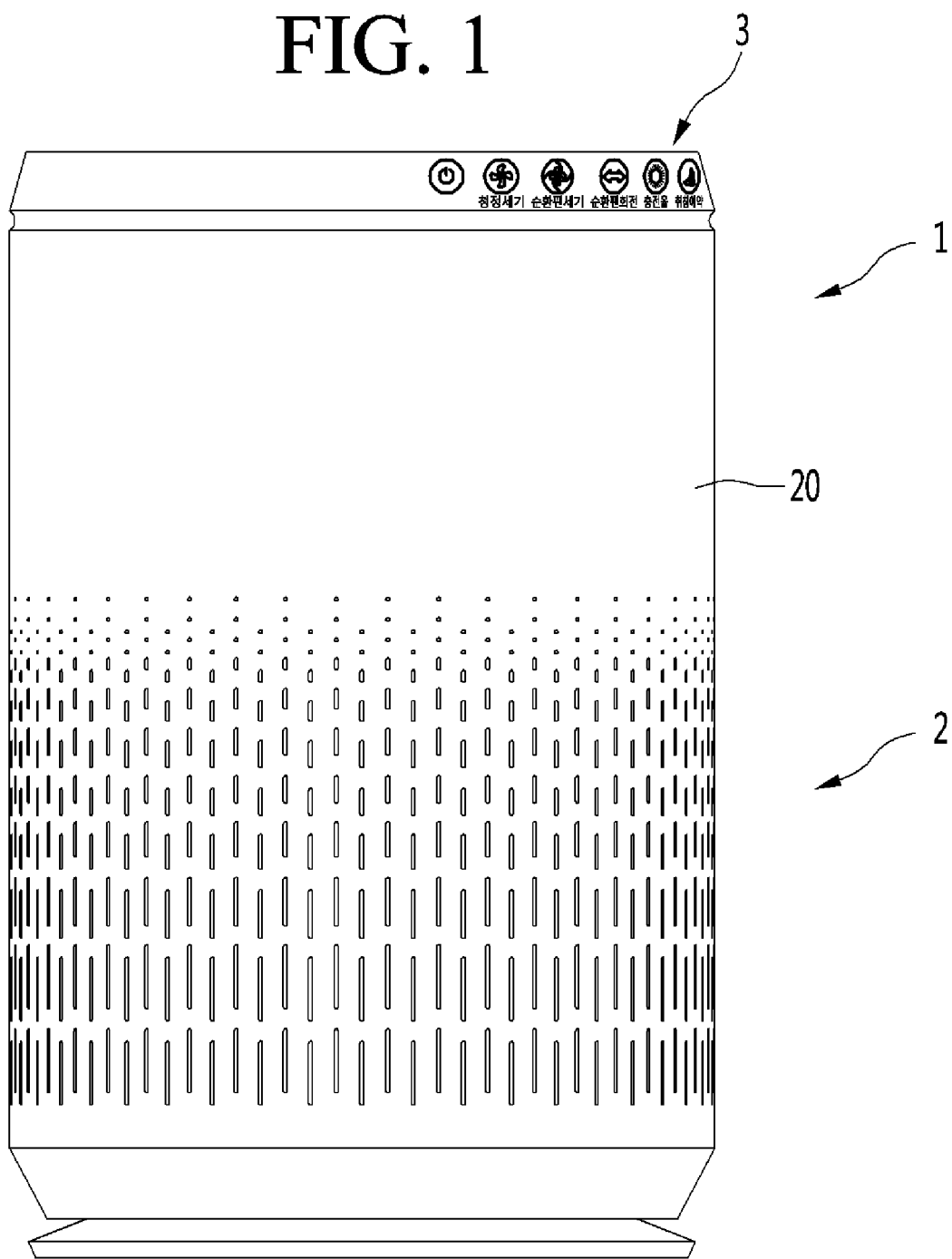
FIG. 1 is a front view of an air purifier according to an embodiment in a state in which a vertical length of the air purifier is reduced.
Figure 2:
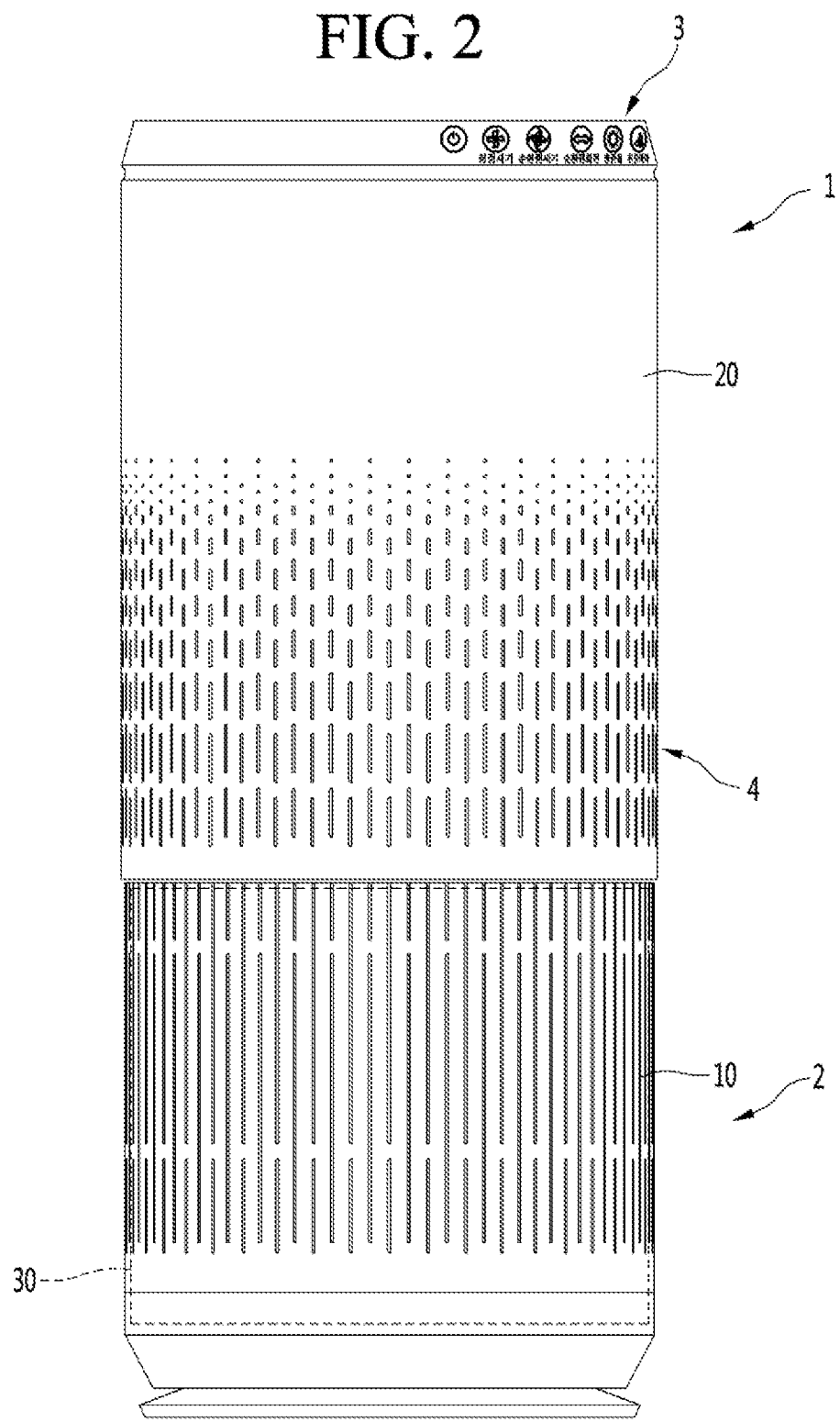
FIG. 2 is a view showing the air purifier of FIG. 1 in a state in which a vertical length of the air purifier is elongated.

Referring to FIGS. 1 and 2, an air cleaner or purifier 1 according to an embodiment may include a first or lower case 10 and a second or upper case 20. The first and second cases 10 and 20 may have cylindrical shell shapes that are long in a vertical direction, but embodiments disclosed are not limited hereto. The first and second cases 10 and 20 may be stacked and overlapped with each other to form an exterior of the air purifier 1 having an adjustable length. Each of the first and second cases 10 and 20 may have a plurality of holes or openings formed at sides to form a suction portion 2. An upper discharge portion 3 may be provided at an upper portion of the air purifier 1 (e.g., on an upper portion of the second case 20) and an intermediate or side discharge portion 4 may be provided at an intermediate portion (e.g., on a side of the second case 20) of the air purifier 1.

The second case 20 may be configured to insert onto the first case 10, and the first and second cases 10 and 20 may alternatively be referred to as inner and outer cases, respectively. The second case 20 may have a slightly larger diameter than that of the first case 10, and the first and second cases 10 and 20 may have a same or similar geometric center.

When the second case 20 is overlapped with the first case 10 by a maximum amount, a vertical length of the air purifier 1 may be in an initial or short state, as shown in FIG. 1. When the second case 20 is lifted upward to overlap by a lesser amount with the first case 10, the vertical length of the air purifier 1 may be lengthened. When the second case 20 overlaps with the first case 10 by a minimum amount, the air purifier 2 may be in a fully lengthened state, as shown in FIG. 2.

When the air purifier 1 is in the initial state, the suction portion 2 may be formed by the holes in both the first and second cases 10 and 20. Air may be suctioned through both the first case 10 and the second case 20. The holes of the first case 10 may not perfectly align with the holes of the second case 20, increasing a resistance to air flow. Alternatively, the holes of the first and second cases 10 and 20 may align and overlap with each other to reduce a resistance to air flow.

When the air purifier 2 is in the lengthened state, the holes of the second case 20 may not overlap with the holes of the first case 10. The suction portion 2 may be formed by the holes in the first case 10, while the holes in the second case 20 may form the side discharge portion 4. Air may be suctioned through the holes of the first case 10 (i.e., the suction portion 2) and discharged through the holes of the second case 20 (i.e., the side discharge portion 4). Details of the side discharge portion 4 will be described with reference to FIGS. 6 and 7.

In the lengthened state where the second case 20 is moved upward, a larger amount of ambient air (i.e., external air outside of the air purifier 1) may be suctioned, as there may be less resistance to a flow of air. The air may flow through the holes of the first case 10 without having first passed through the holes of the second case 20. A "power mode" may be when the air purifier 1 operates in the lengthened state. A "normal mode" may be when the air purifier 1 operates in the short or initial state where the second case 20 is moved downward to overlap with the first case. In the normal mode, suctioned air may face a greater resistance. The holes of the first case 10 and the holes of the second case 20 may have different sizes and/or shapes so as not to perfectly align. Details of the holes of the first and second cases 10 and 20 will be described later with reference to FIGS. 6 and 7.

Reference numeral 30 shown by a dotted line in FIG. 2 indicates an air cleaning or suctioning area. A fan 16 and a filter or filter assembly 12 (FIG. 3) may be provided inside of the air cleaning area to draw an airflow and filter foreign matter from the suctioned air. An internal structure of the air cleaning area will be described with reference to FIG. 3.

Figure 3:
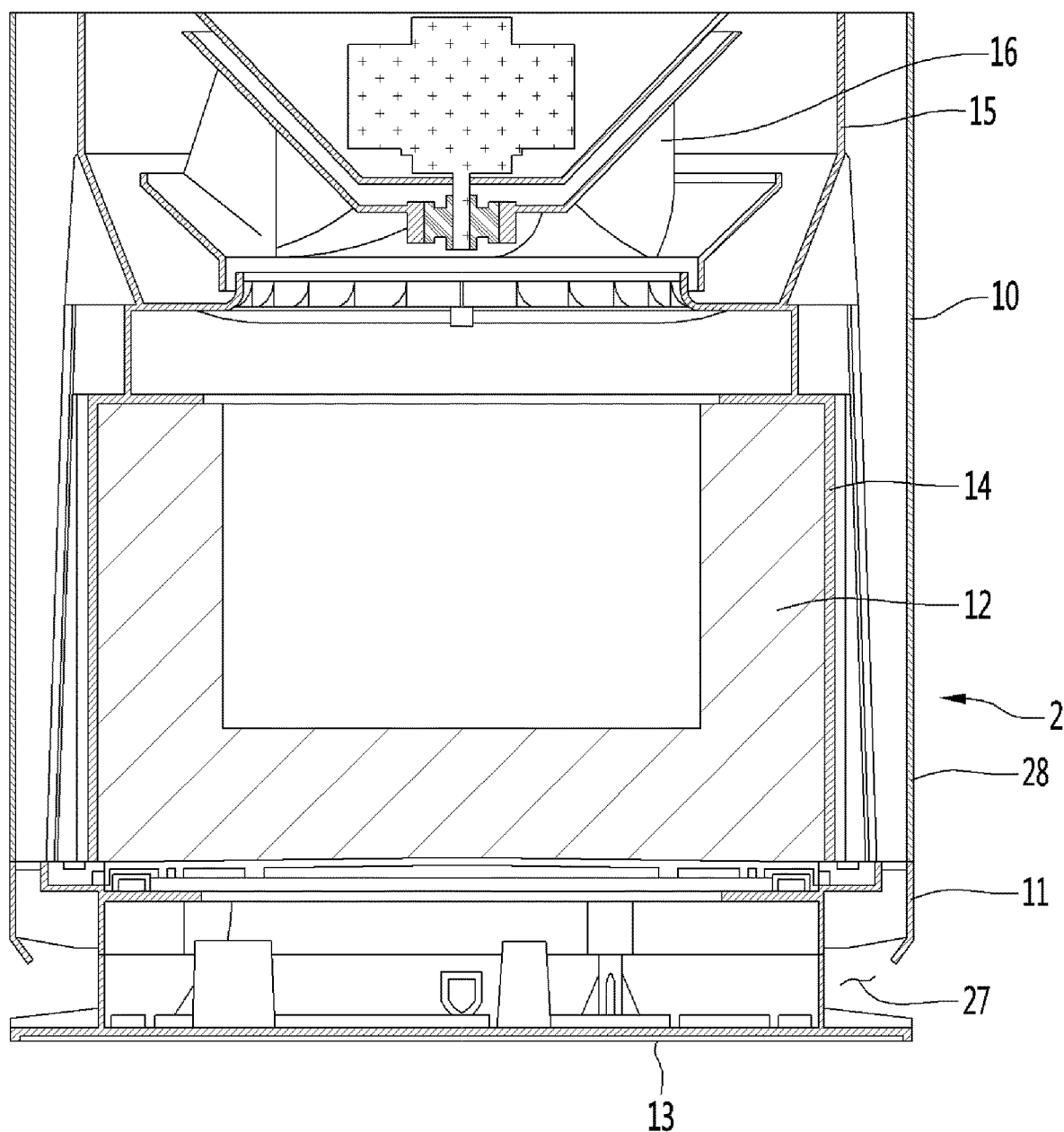
FIG. 3 is a cross-sectional cut view of an air purifier according to an embodiment.

Referring to FIG. 3, an axial direction of the fan may be in the vertical direction of the air purifier 1, while a radial direction may extend in a horizontal direction of the fan. The axial direction may correspond to a central axis direction (i.e., a motor axial direction) of the fan 16, i.e. The radial direction may be perpendicular to the axial direction. The circumferential direction may be an imaginary circular direction formed as a rotation about the axial direction by a fixed distance in the radial direction. Air flow may refer to a flow in which ambient air present near a lower portion of the air purifier 1 is suctioned, and clean air is discharged.

The air purifier 1 may include a base 13 provided below and spaced apart from the first case 10. The base 13 may be placed on a floor or ground surface. A base suction space or portion 27 may be formed between a bottom of the first case 10 and a side or bottom of the base 13. Air may be suctioned through the base suction portion 27. Such air may enter the air purifier 1 from under the first case 10.

A lower side portion of the first case 10 may include the holes of the first case 10. When the air purifier 1 is in the lengthened state, the suction portion 2 may be formed by a combination of the base suction portion 27 and the holes of the lower side portion 28. When the air purifier 1 is in the initial state, the suction portion 2 may be formed by a combination of the base suction portion 27, the holes of the lower side portion 28 of the first case 10, and the holes of the second case 20 (FIG. 1).

A filter 12 may be provided on an interior of the first case 10. Air passing through the lower side portion 28 of the first case 10 and the base suction portion 27 between the first case 10 and the base 13 may flow into an outer circumferential surface of the filter 12. The filter 12 may be a cylindrical body and may have a filter surface to filter air. However, shapes of the filter 12 are not limited to cylindrical shapes, and the filter 12 may alternatively have a rectangle or other shape. A shape of the filter 12 may correspond to an inner contour of the first case 10. The filter 12 may, for example, a HEPA filter, a carbon filter, a pleated filter, a mesh filter, a foam filter, etc. or any combination of these filters.

The filter 12 may have a rounded (e.g., cylindrical) outer contour so that air may flow through the filter 12 from any direction, or at least any radial direction, increasing a filtering area of the filter 12. The filter 12 may be provided as a solid cylinder or a cylindrical shell having a bottom surface so that air may be suctioned through the bottom surface so that air may flow through the filter 12 in the axial direction from a bottom, further increasing the filtering area. The filter 12 may optionally have a top surface. Alternatively, the filter 12 may be a cylindrical shell not having a bottom or top surface.

For convenience of description, the filter 12 will be described as a cylindrical shell shape having a bottom surface. A cylindrical body may correspond to a side surface of the filter 12, and a bottom surface may correspond to a lower surface of the filter 12.

The air purifier 1 may further include a filter frame 14 forming a mounting space in which the filter 12 may be mounted. The filter frame 14 may support an entire load of each component that performs an internal function of the air purifier 1 inside the first case 10.

The mounting space may be formed in a cylindrical shape corresponding to the shape of the filter 12. The filter 12 may be slidably inserted into and received in the mounting space during a mounting process, and may be slidably pulled and drawn out from the mounting space during a separating process. Details of a mounting and separating of the filter 12 may be similar to a process described in U.S. application Ser. No. 16/818,096 (HI-1522), the entire contents of which are incorporated by reference herein.

A blowing or suction device or assembly may be provided inside the first case 10 to suction air. The blowing device may include the fan 16 and a fan housing 15. The fan 16 ay be housed in the fan housing 15. The fan housing 15 may be provided at an outlet side of (i.e., above) the filter 12 and supported by the filter frame 14.

The fan 16 may provide a flow pressure of air through rotation. The fan 16 may be provided as a centrifugal fan to introduce air in the axial direction and discharge air upward and in the radial direction.

Filtered air discharged from the fan 16 may be discharged through the upper discharge portion 3 and the side discharge portion 4 in the power mode (where the air purifier 1 is lengthened) and may be discharged through the upper discharge portion 3 in the normal mode (where the air purifier 1 is shortened). The upper discharge portion 3 may be formed on top of the second case 20 so that the upper discharge portion 3 remains at a top of the air purifier 1 even when the second case 20 is lifted, while the discharge portion 4 may only be formed in the normal mode by the holes of the second case 20, which are provided above the holes of the first case 10 in the normal mode. (FIGS. 1 and 2).

Figure 4:
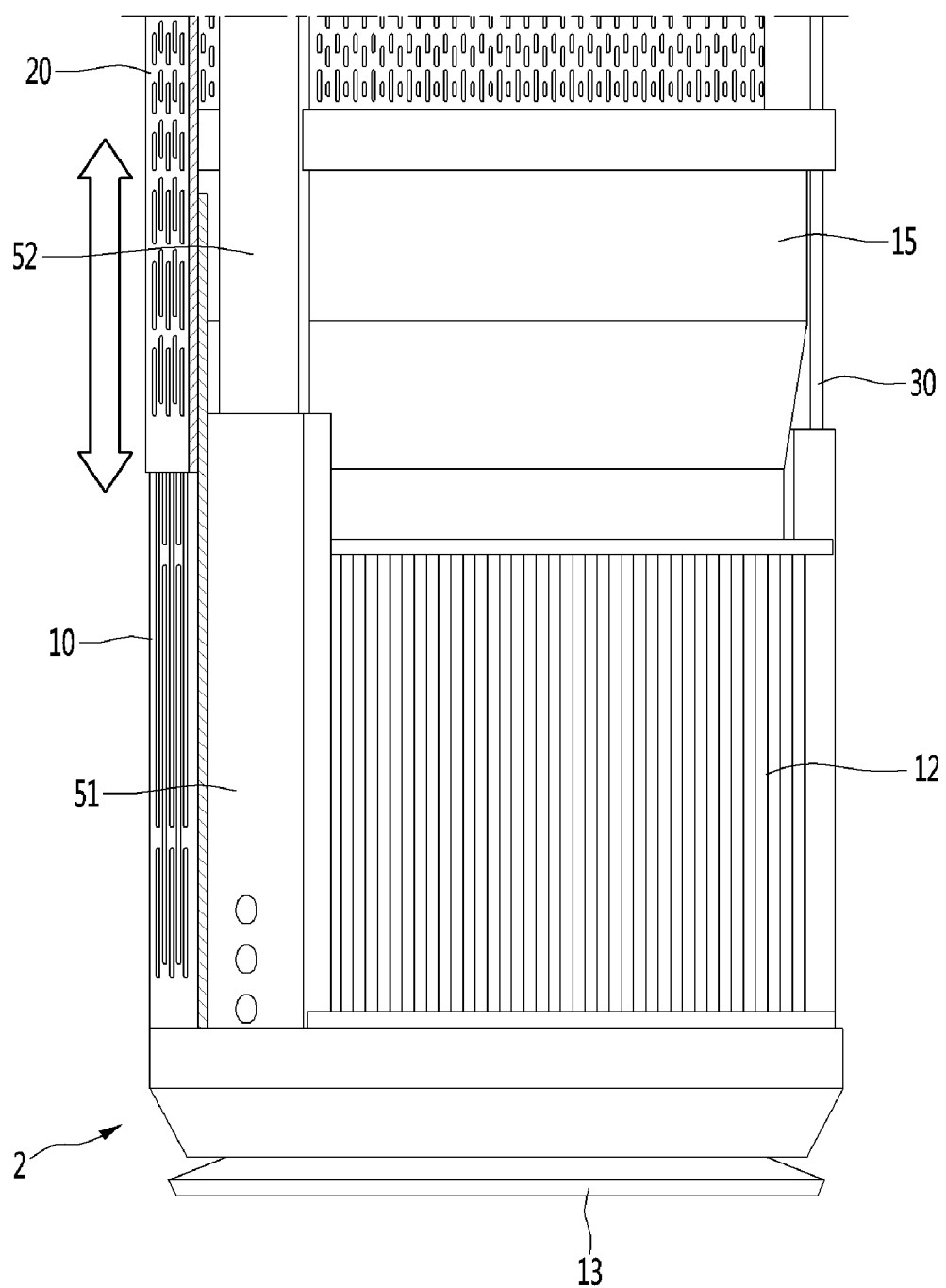
FIG. 4 is a front view of an air purifier showing a partially cut view of a case.

Referring to FIG. 4, the first case 10 may remain in an initial or position, while the second case 20 may move up and down outside of the first case 10. Although FIG. 4 shows the filter 12, FIG. 4 shows a cut view of the first case 10, in such a state where the first case 10 remains in its initial position to be below the second case 20, the filter 12 may not be visible.

An LM guide (Linear Motion Guide) assembly may be provided to guide a sliding movement of the second case 20 with respect to the first case 10. The LM guide assembly may include a first LM guide 51 fixed to a side of the first case 10 and a second LM guide 52 fixed to a side of the second case 20. Via a sliding action of the first and second LM guides 51 and 52, the LM guide assembly may accurately guide upward and downward movement of the second case 20 to elongate or contract the vertical length of the air purifier 1.

The first LM guide 51 may be fixed to interior devices of the first case 10 such as the fan housing 15 and the filter frame 14 inside the air cleaning area 30 (FIGS. 2-3). The fan housing 15 and/or the filter frame 14 may be fixed directly or indirectly to the first case 10 and may not move with respect to the wall of the first case 10. The LM guide assembly, the filter frame 14, and the fan housing 15 may form a frame 30 that supports the air purifier 1 and maintains an exterior shape.

Figure 5:
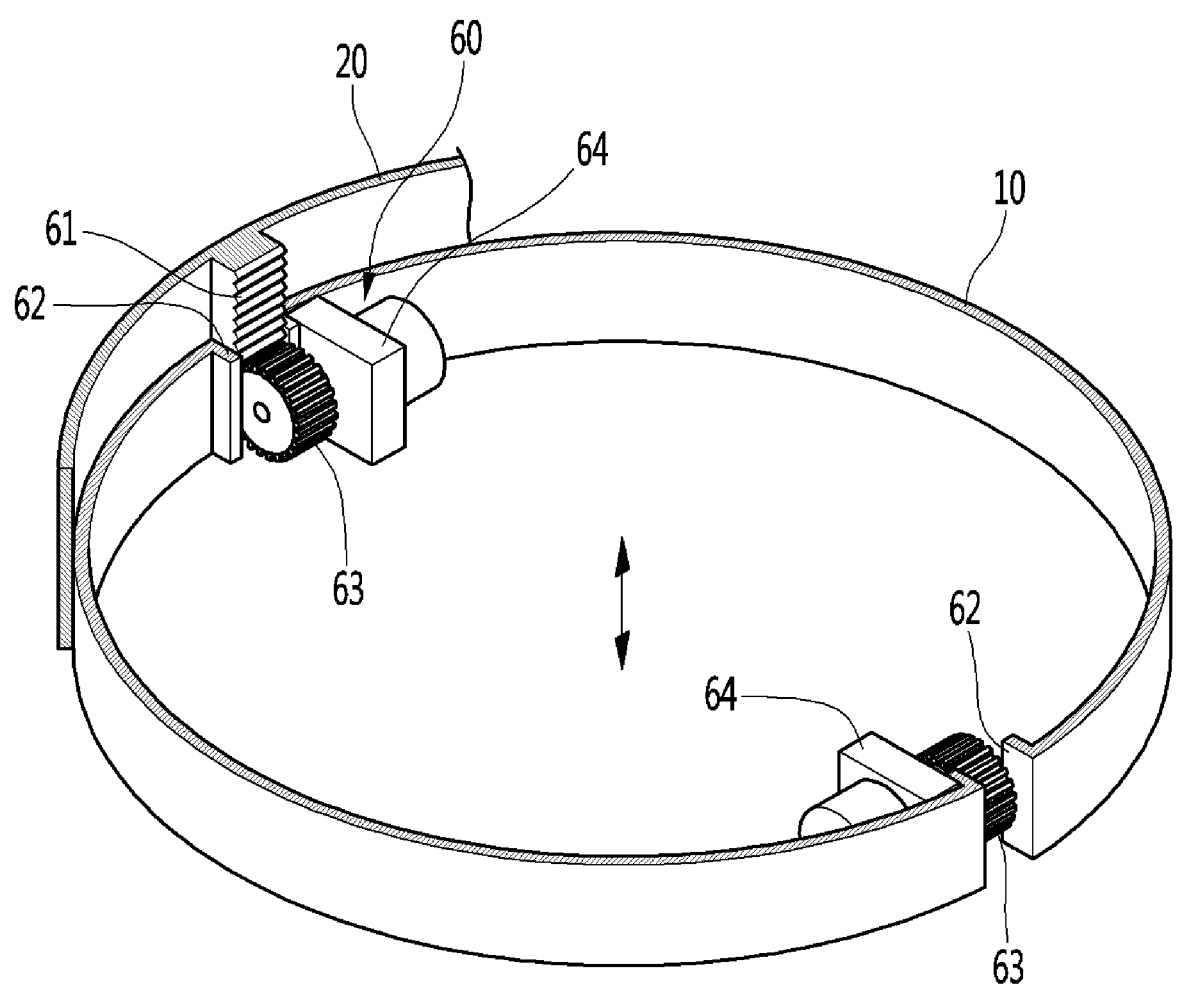
FIG. 5 is a view showing a lift guide of a second case.

Referring to FIG. 5, the second case 20 may move with respect to the first case 10 via a gear tooth method. The second case 20 may include a rack 61 formed of gear teeth or guide grooves. The first case 10 may include a pinion or gear 63 configured to engage with the rack 61 of the second case 20, and a drive motor 64 to drive or rotate the pinion 63 in a first or forward direction (e.g., clockwise) and a second or reverse direction opposite to the first direction (e.g., counterclockwise). The pinion 63 and the rack 61 may be interlocked with each other by the forward or reverse rotation of the drive motor 64 so that the second case may ascend and descend. The pinion 63 may be formed on an upper inner portion of the first case 10 and the rack 61 may be formed on a lower inner portion of the second case 20 at positions where the first and second cases 10 and 20 overlap.

The first case 10 may include a rack guide member 62, which may be an opening configured to fit around sides or edges of the rack 61 of the second case 20. The pinion 63 may be provided between sides of the rack guide member 62 to couple to the rack 61.

The second case 20 may include two racks 61, one formed at a first side and another formed at a second side opposite the first side. The first case 10 may include two pinions 63 to correspond to each rack 61 of the second case 20 and two drive motors 64 to drive the two pinions. The first case may have two drive motors 64 installed in the first case 10 to drive the two pinions 63 in the normal direction and the reverse direction, respectively.

The two drive motors 64 may be decelerated and rotated through a built-in reduction gear 60. The reduction gear 60 may solve problems arising when a rotational speed of the drive motor 64 is high while a rotational torque of the drive motor 64 is low.

Embodiments disclosed herein are not limited to two sets of racks 61, gears 63, drive motors 64, etc. As an example, there may be three or more racks 61 spaced apart by equal intervals along the circumferential direction of the second case 20. The larger the diameter of the first and second cases 10 and 20 are, or the smaller the size and power of the driving motor 64, the more sets of racks 61 and gears 63 may be provided to support a weight and maintain stability of the second case 20 during lifting.

Lifting mechanisms of the first and second case 10 and 20 are not limited to rack and pinion or geartooth methods, and may have various other configurations. For example, a plunger type driving mechanism using hydraulic pressure and/or pneumatic or air pressure may be applied, especially in cases where a weight of the second case 20 may be large. A solenoid may also be applied.

Figure 6:
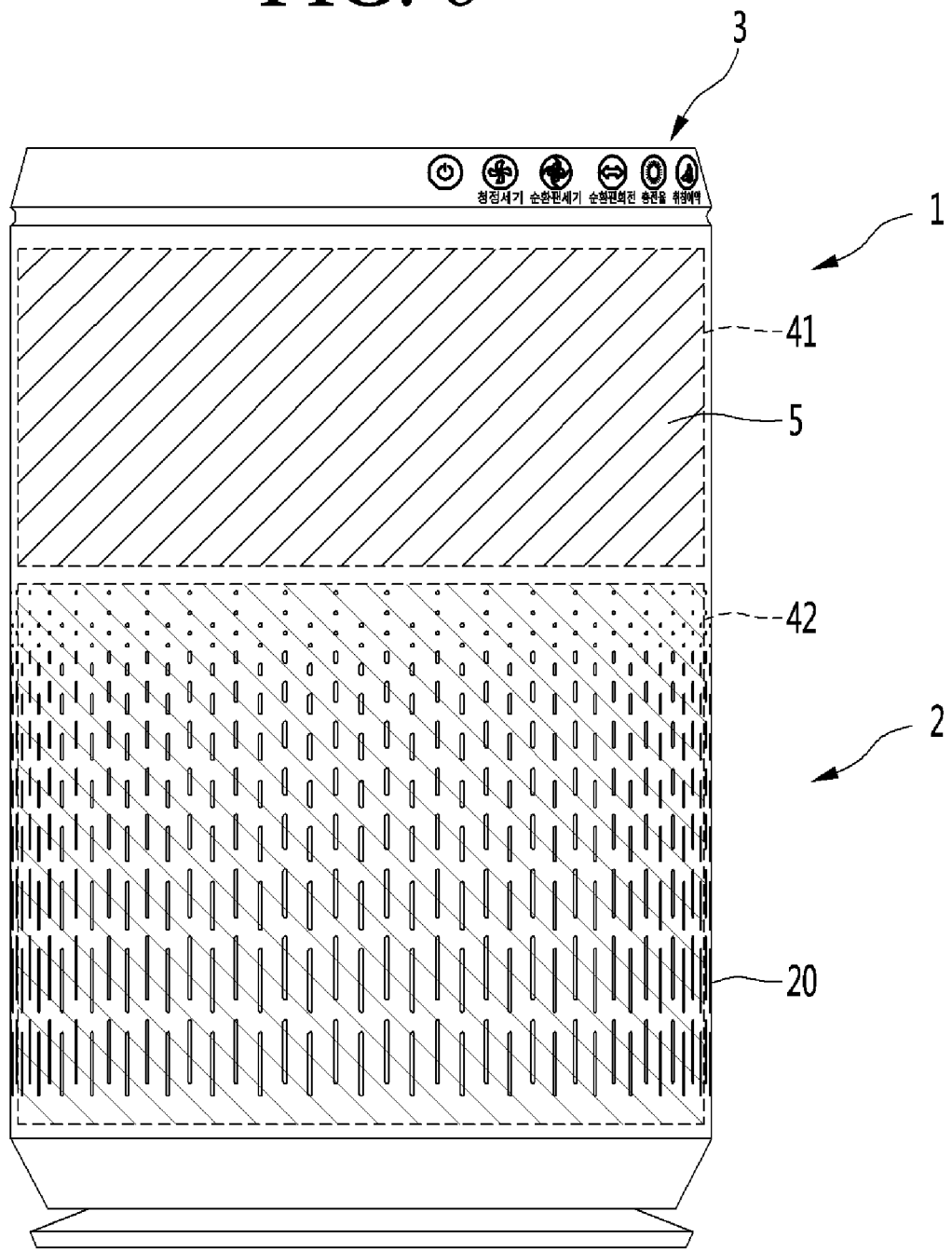
FIG. 6 is a view showing a normal mode when the air purifier is operating.
Figure 7:
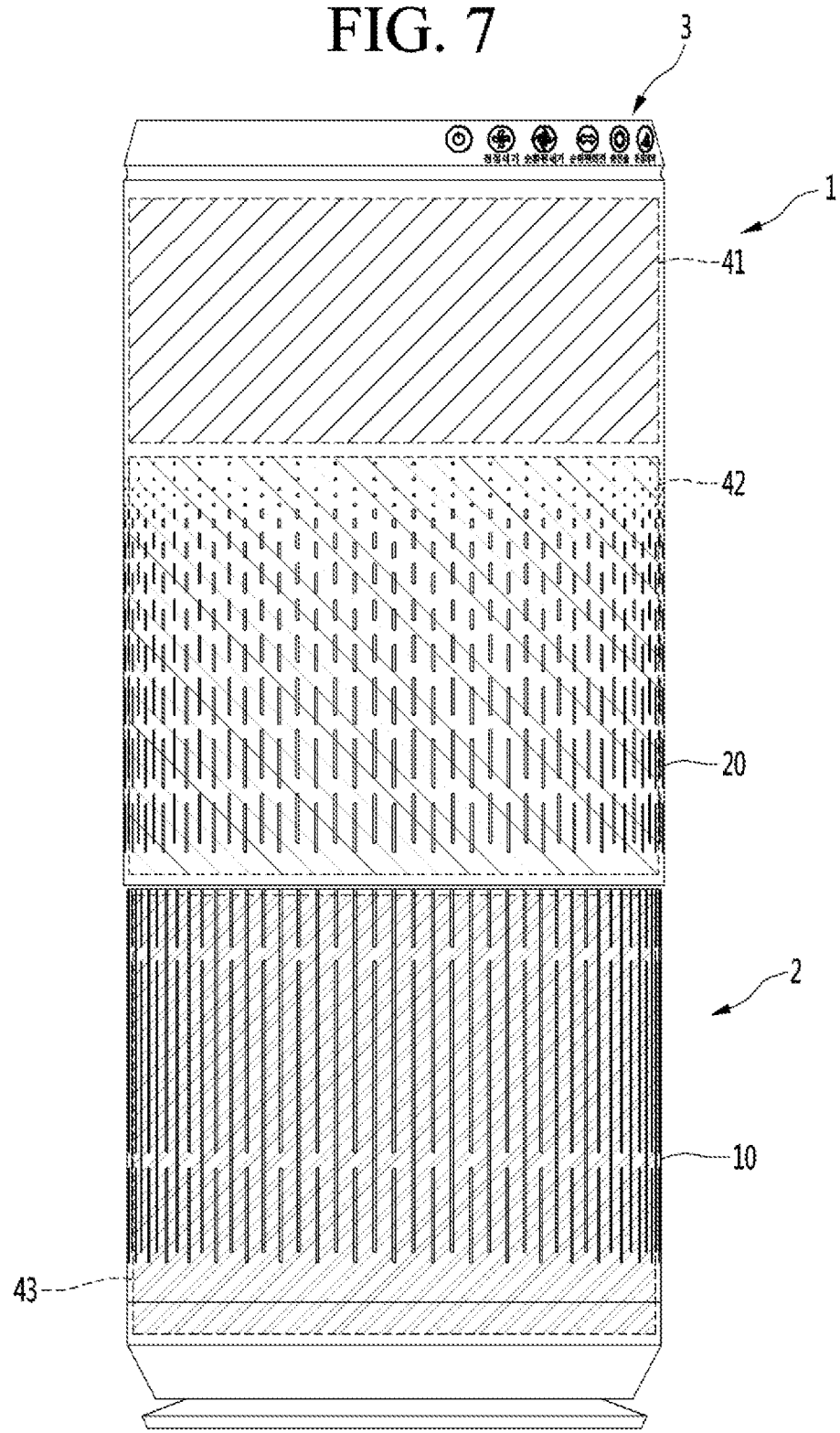
FIG. 7 is a view showing a power mode when the air purifier is operating.

Referring to FIGS. 6 and 7, the first case 10 may have a first hole region or area 43 on the lower side portion 28 (FIG. 3). The first hole region 43 may include a plurality of elongated holes or slits formed in the wall of the first case 10 and extending in the vertical direction. The holes in the first hole region 43 may be provided in primarily two forms: a first form having a first length and a second form having a second length shorter than a first length. Air passing through the suction portion 2 may be introduced into an interior of the air purifier 1 through the first hole region 43.

The second case 20 may have a second hole region 42 and a non-porous or solid region 41. The second hole region 42 may be provided in a lower portion or section of the second case 20, while the non-porous or solid region 41 may be provided in an upper portion or section of the second case 20.

The second hole region 42 may include a plurality of elongated holes or slits formed in the wall of the second case 20 and extending in the vertical direction. The holes in the second hole region 42 may come in a variety of forms having a variety of lengths. Holes provided in a lower portion of the second hole region 42 may have longer lengths than holes provided in an upper portion of the second hole region 42. Lengths of the holes of the second hole region 42 may gradually decrease in an upward direction.

Various opening and closing structures to open and close the top and side of the upper discharge portion 3 may be provided in an interior of the second case 20 in the non-porous region 41. An internal structure of the air purifier 1 may be configured to be compact and efficient, as the blowing device may be provided inside the first case 10 and structures to open and close the upper discharge portion 3 may be provided inside the second case 20 at or within the non-porous region 41. Details of an opening and closing of the upper discharge portion 3 will be described later with reference to FIGS. 9 and 10.

The non-porous region 41, the first hole region 43, and the second hole region 42 may be predetermined regions and are indicated by dotted lines in FIG. 7. In the normal mode, the first hole region 43 of the first case 10 and the second hole region 42 of the second case 20 may overlap to form the suction portion 2, and the second hole region 42 may partially obstruct a suction of air. In the power mode, the second hole region 42 of the second case 20 may become the side portion discharge portion 4, and suction of air may be unobstructed.

An aperture ratio of the second hole region 42 and the first hole region 43 may be predetermined based on sizes of the holes in the first hole region 43 and sizes of the holes in the second hole region 42. As an example, an average size of the holes in the second hole region 42 may be smaller than an average size of the holes in the first hole region. Alternatively or in addition thereto, the first hole region 43 may have a first opening ratio (a size of the largest hole in the first hole region 43 compared to a size of the smallest hole in the first hole region 32), and the second hole region 42 may have a second opening ratio (a size of the largest hole of the second hole region 42 compared to a size of the smallest hole of the second hole region 42). The first opening ratio may be larger than the second opening ratio.

The first hole region 43 may have a first total opening ratio, which is a ratio of a total combined area of the holes of the first hole region 43 compared to a total surface area of the wall of the first case 10. The second hole region 42 may have a second total opening ratio, which is a ratio of a total combined area of the holes of the second hole region 42 compared to a total surface area of the wall of the second case 20. The larger the first and second average opening ratios, the smaller the flow resistance of air. The smaller the first and second total opening ratios, the larger the flow resistance of air. The first and second total opening rations may be adjusted by adjusting a number of holes or a size of each of the holes.

Since an average size of the holes in the first hole region 43 may be larger than an average size of the holes in the second hole region 42, suction efficiency of the suction portion 2 may be increased when the second case 20 is lifted and the air purifier 1 is operated in the power mode. Discharge efficiency may be decreased when the second case 20 is lowered and the air purifier 1 is operated in the normal mode, as air may be discharged primarily through the upper discharge portion 3, and the side discharge portion 4 may not be formed because the second hole region 42 is part of the suction portion 2. The aperture ratios, first and second opening ratios, and/or first and second total opening ratios of the first and second hole regions 43 and 42 may be varied based on performance and other requirements desired of the air purifier 1.

In the normal mode when the second case 20 is moved downward, the first hole region 43 and the second hole region 42 may overlap each other to provide the suction portion 2, increasing the flow path resistance. The side discharge portion 4 may not be operated, and clean or filtered air may be discharged through the upper discharge portion 3. In the power mode when the second case 20 is lifted upward, the second hole region 42 may function as the side discharge portion 4, and may not overlap with the first hole region 43. The suction portion 2 may be formed by the first hole region 43 and the bottom suction portion 27 (FIG. 3).

The air purifier 1 may also be operated at a state in between the normal mode and power mode. The second case 20 may be lifted upward but not by a maximum amount. In such a situation, the second hole region 42 may partially overlap with the first hole region 43, and a non-overlapping portion of the second hole region 42 may serve as the side discharge portion 4 and an overlapping portion of the second hole region 42 may form the suction portion 2 with the first hole region 43. A height of the second case 20 may be adjusted based on a desired performance by the user. As a height of the second case 20 is increased, suctioning and discharging efficiency may also be increased. The power mode may suction more air, purify more air, and discharge more filtered air as compared with the normal mode.

Figure 8:
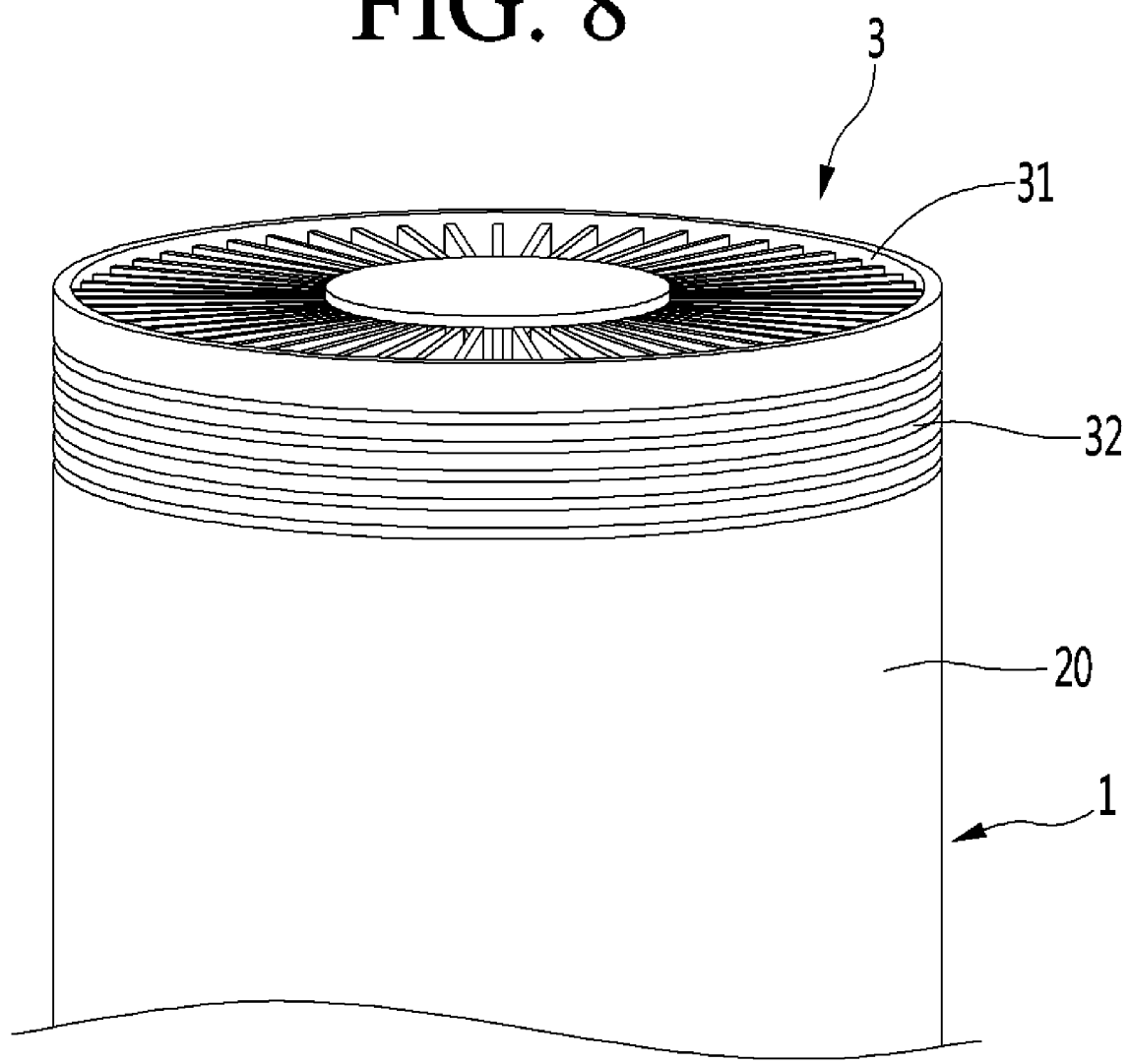
FIG. 8 is a view showing an upper discharging portion of the air purifier according to an embodiment.

Referring to FIG. 8, the upper discharge portion 3 may be provided with a top discharge portion or grill 31 and a side discharge portion or grill 32. The top discharge grill 31 may be provided on an upper surface of the air purifier 1 and discharge clean air upward. The side discharge grill 32 may be provided on a circumferential or side of the air purifier 1. The discharge portion 3 may be provided at an upper end of the non-discharge region 41 (FIG. 7) of the second case 20. The side discharge grill 32 may increase a lateral flow velocity of clean air discharged from the upper discharge portion 3.

The top discharge grill 31 may be formed as a grill. The side discharge grill 32 may have a grill or slit structure. As an example, the side discharge grill 32 may be formed by a plurality of slits extending along the circumferential direction to form a ring shape. The rings may be spaced apart in the axial direction. The second case 20 may have ribs of flanges extending through the rings to support portions of the case 20 provided between the rings of the side discharge grill 32. Each of the side discharge grill 31 and the top discharge grill 32 may have a plurality of ribs capable of guiding a flow direction of the clean air.

The top discharge grill 31 and the side discharge grill 32 may be opened and closed separately from each other. Accordingly, at least one of the top discharge grill 31 and the side discharge grill 32 may be selected to discharge clean air provided from the fan 16. Various operating modes of the air purifier 1 may be implemented by various adjustments of the top and side discharge grills 31 and 32 to adjust a flow of discharged air, improving satisfaction by allowing customization through a variety of discharge modes.

Figure 9:
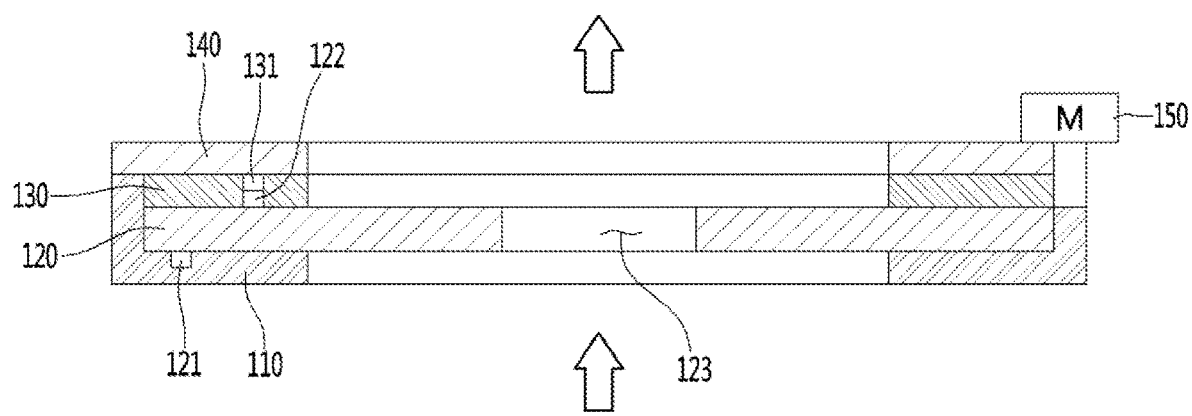
FIG. 9 is a cross-sectional view for explaining an opening and closing of a top of the upper discharge portion.
Figure 10:
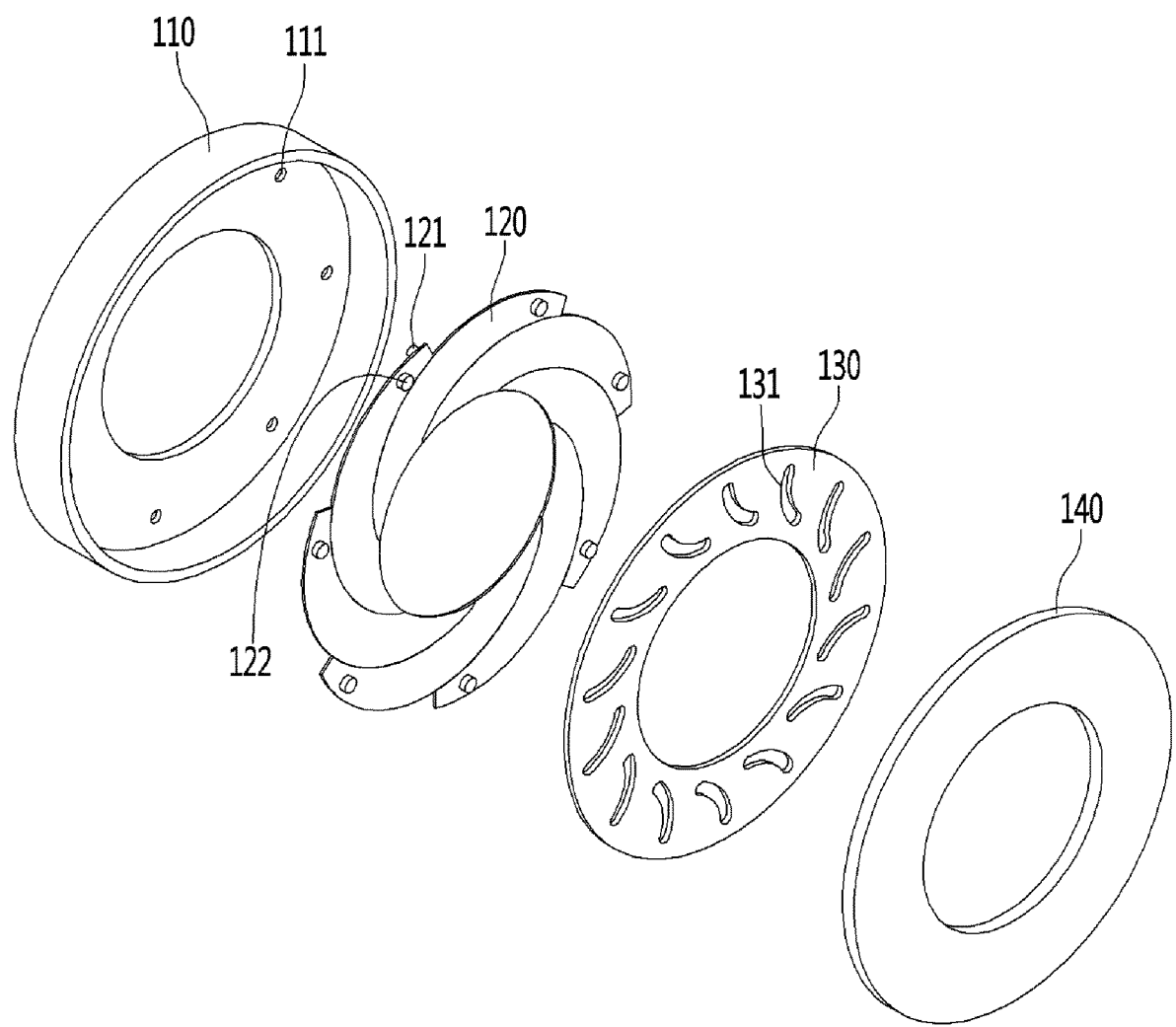
FIG. 10 is an exploded perspective view of the top of upper discharge portion.

Referring to FIGS. 9 and 10, an opening and closing structure to open and close the top discharge grill 31 may be provided horizontally within an upper portion of the second case 20. A central opening 123 may be formed in a middle of the opening and closing structure. The clean air discharged from the fan 16 may be blown upward through the central opening 123 to be discharged out the top discharge grill 31.

The opening and closing structure for the top discharge grill 32 may include a lower cover or case 110 provided on a lower side and an upper cover or lid 140 provided on an upper side. The lower and upper covers 110 and 140 may provide a receiving space. A wing device 120 and a driving plate 130 may be provided in the receiving space. The wing device 120 may have a plurality of variable wings. At least one motor 150 may be provided to rotate the driving plate 130. A driving shaft of the motor 150 may couple to an outer circumferential surface of the driving plate 130 so that the driving plate 130 is rotated by the motor 150.

The wing device 120 may expand and contract to open and close the central opening 123. The wing device 120 may operate similarly to a camera shutter device. FIG. 10 shows an expanded state of the wing device 120. In the expanded state, wings of the wing device 120 may be expanded outward to align next to each other, and inner ends may form a circular opening. In a contracted state, the wings of the wing device 120 may overlap with each other, and inner ends may move closer to each other to close the circular opening and obstruct the central opening 123.

Rotary shafts 121 and 122 may be coupled to outer ends of the wings of the wing device 120. Rotary shafts 121 may be lower shafts coupled to a lower side of the wing device 120, while rotary shafts 122 may be upper shafts coupled to an upper side of the wing device 120. The lower shafts 121 may be fixed to the lower cover 110. The lower cover 110 may include holes 111 in which the lower shafts 121. A bottom section of the wing device 120 may remain fixed via the lower shafts 121, while an upper section of the wing device 120 may open and close via rotation or pivoting of the upper shafts 122.

The upper shafts 122 may be rotated or pivoted by the driving plate 130. Each wing, which may have an upper shaft 122, may be rotated or pivoted by a same angle and move by a same distance during expansion and contraction based on positions of the upper shafts 122 and a formation of the driving plate 130.

The driving plate 130 may have a plurality of guide slots 131 formed to correspond to the plurality of upper shafts 122. The guide slot 131 may slide with respect to the upper shaft 122, and a direction and movement of the guide slot 131 with respect to the upper shaft 122 may be restricted by a size and shape of the guide slot 131. The guide slot 131 may have a smooth curvature toward a center of the driving plate 130. When the driving plate 130 rotates, the upper shaft 122 may ultimately be restricted by an inner or outer end the guide slot 131 and be pulled or pushed. The movement of the upper shaft 122 may lead to expansion and contraction of the wing device 120.

The driving plate 130 may be rotated by power provided by the motor 150. When the driving plate 130 rotates, the guide slot 131 may rotate, and the guide slots 131 may move to pull or push the upper shafts 122 to move inward toward or outward away from the center of the driving plate 130 to open and close the central opening 123. The upper shaft 122 may slide on an inner surface of the guide slot 131.

The movement of the upper shaft 122 in and out may be followed by an operation of expanding and contracting the wing device 120 in and out. Each of the wings of the wing device 120 may have an upper section, which moves in and out with respect to a bottom section, which may be fixed by the lower shaft 121. The movement of the wings leads to overlapping so that a size of the central opening 123 may be increased or decreased.

A size of the central opening 123 may determine an amount of air discharged through the top discharge grill 31. The holes 123 pass through the center of the lower cover 110, the variable wing 120, the driving plate 130, and the upper cover 140. A diameter of the central opening 123 may be reduced or enlarged by overlapping two or more of the wings of the wing device 120. As the diameter of the opening 123 is increased, an amount of clean air discharged may also be increased. As the diameter of the opening 123 is decreased, an amount of clean air discharged may also be decreased.

The size of the central opening 123 may therefore be enlarged or reduced via the motor 150 by a forward rotation or a reverse rotation of the driving plate 130 to increase or decrease an amount of discharged air. The top discharge grill 31 may be completely closed, completely opened, or partially opened based on an adjustment of the size of the central opening 123.

Figure 11:
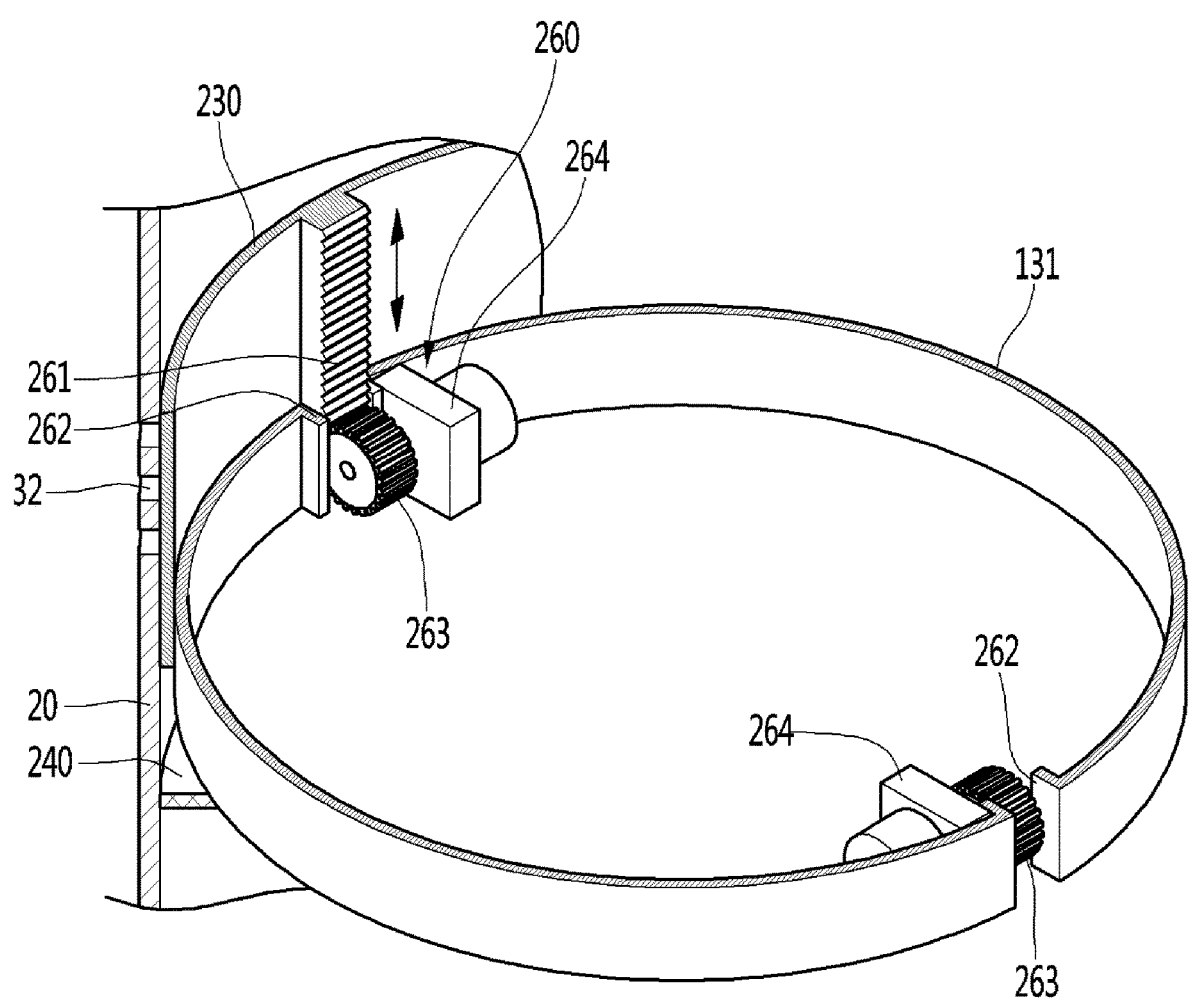
FIG. 11 is a perspective view explaining an opening and closing of a side of the upper discharge portion.

Referring to FIG. 11, the side discharge grill 31 may be opened and closed via a vertical movement of a door 230. The door 230 may be a wall provided inside of the second case 20. To close the side discharge grill 31, the door 230 may be moved to a position overlapping with the holes of the side discharge grill 31 to obstruct an air flow out of the side discharge grill 31. To open the side discharge grill 31, the door 230 may be moved to a position (i.e., above or below) that does not overlap with the holes of the side discharge grill 31 so that air may flow out of the side discharge grill 31 unobstructed.

As exemplified in FIG. 11, the door 230 may overlap with the side discharge grill 31 to close the side discharge grill 31. The side discharge grill 31 may be opened by lowering the door 230. Alternatively, side discharge grill 31 may be opened by raising the door 230. The door 230 may be raised and lowered by a rack and pinion and/or gear tooth method, similar to the method of raising and lowering the second case 20 with respect to the first case 10 shown in FIG. 5. However, embodiments disclosed are not limited hereto. For example, a plunger type driving mechanism using hydraulic pressure and/or pneumatic pressure may be applied, especially when a load on the door 230 and any member attached thereto is large. When it is necessary to open and close the door 230 quickly, a mechanism such as a solenoid may be used. The door 230 and a structure to raise and lower the door 230 may be located inside of the second case 20 at the non-porous region 41 and extend above the non-pours region 41 to overlap with the discharge portion 3.

FIG. 11 exemplifies a rack and pinion method. A motor support portion or frame 131 may be fastened to the second case 20 via a flange or pedestal 240. The frame 131 may have a ring or cylindrical shell shape, and the flange 240 may extend radially outward to fix to an inner surface of the second case 20. An inner side of the door 230 facing the motor support frame 131 may include a rack 261. The door 230 may also be formed in a cylindrical shell shape so as to cover the rings of the side discharge grill 32, and the door 230 may include a plurality of racks 261 spaced apart along the circumferential direction on the inner surface of the door 230. The motor support frame 131 may include at least one pinion 263 to correspond to the rack 261 and at least one motor 264 to rotate the pinion 263 in a forward or first direction and a reverse or second direction opposite to the first direction. As exemplified in FIG. 11, the door 230 may include two racks 261 at opposite sides, and the motor support frame may include two pinions 263 rotated by two motors 264, respectively. When the two pinions 263 are at opposite sides, they may rotate in opposite directions to lift and lower the door 230. Alternatively, there may be three or more racks 261 may be provided at three or more positions along a circumferential direction of the door 230.

The pinion 263 and the rack 261 may be interlocked with each other by teeth or guide grooves. When the door 230 is raised, the side discharge grill 32 may be closed. When the door 230 is lowered, the side discharge grill 32 may be opened. The two drive motors 264 may be capable of decelerating rotation through a built-in reduction gear 260 to improve a driving action in the event of low torque and high rotation speed.

Figure 12:
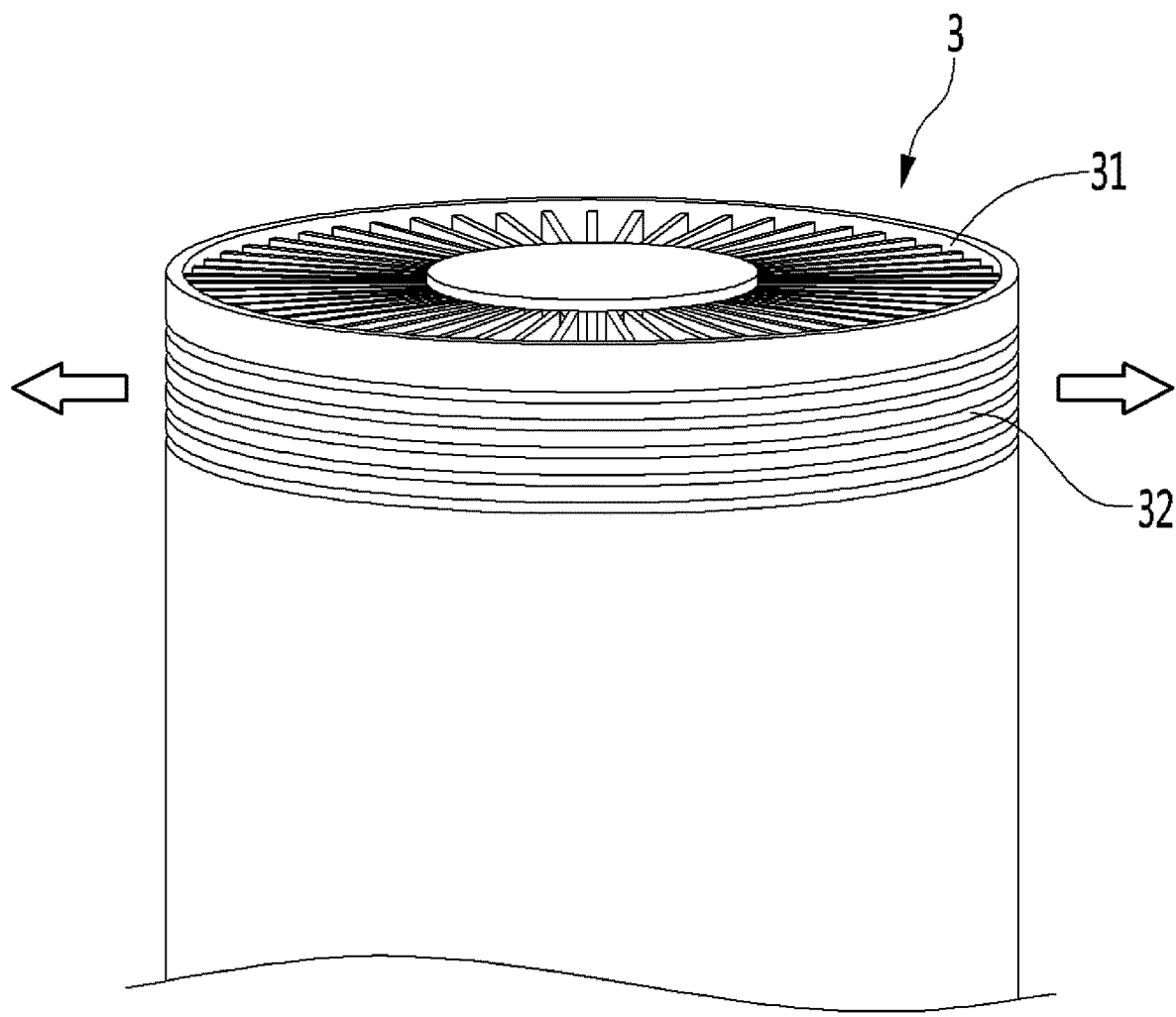
FIG. 12 shows an implementation of a discharging mode where only the side of the upper discharge portion is opened.

Referring to FIG. 12, the top discharge grill 31 may be closed while the side discharge grill 32 may be opened. Purified air may be discharged laterally from the side discharge grill 32 at a high flow rate through a relatively small discharge area, and may directly affect adjacent users. Such air flow discharged through the side discharge grill 32 may be referred to as direct air flow.

Figure 13:
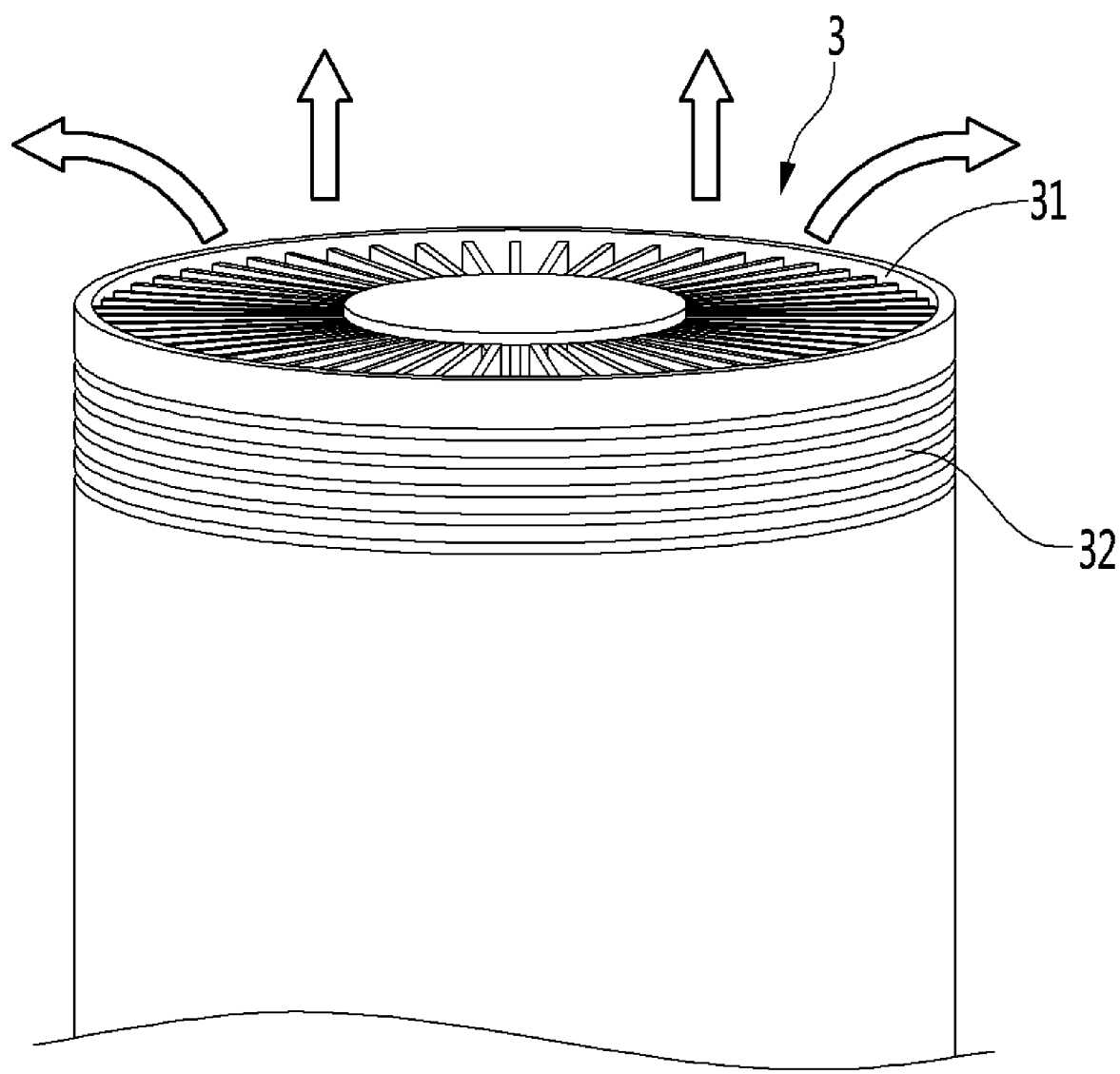
FIG. 13 shows an implementation of a discharging mode where only the top of the upper discharge portion is opened.

Referring to FIG. 13, the top discharge grill 31 may be opened while the side discharge grill 32 may be closed. Purified air may be discharged upward through the top discharge grill 31 toward a ceiling and fall back downward or be redirected back downward after colliding with the ceiling or another object, and may be dispersed before reaching any users. Such air flow discharged through the top discharge grill 31 may be referred to as indirect air flow.

The user may control an amount of direct and indirect air flow by adjusting an opening and closing of both the top and side discharge grills 31 and 32. For example, if the user desires more direct air flow and less indirect air flow, the user may open the side discharge grill 32 and close the top discharge grill 31. If the user desires less direct air flow and more indirect air flow, the user may close the side discharge grill 32 and open the top discharge grill 31.

Figure 14:
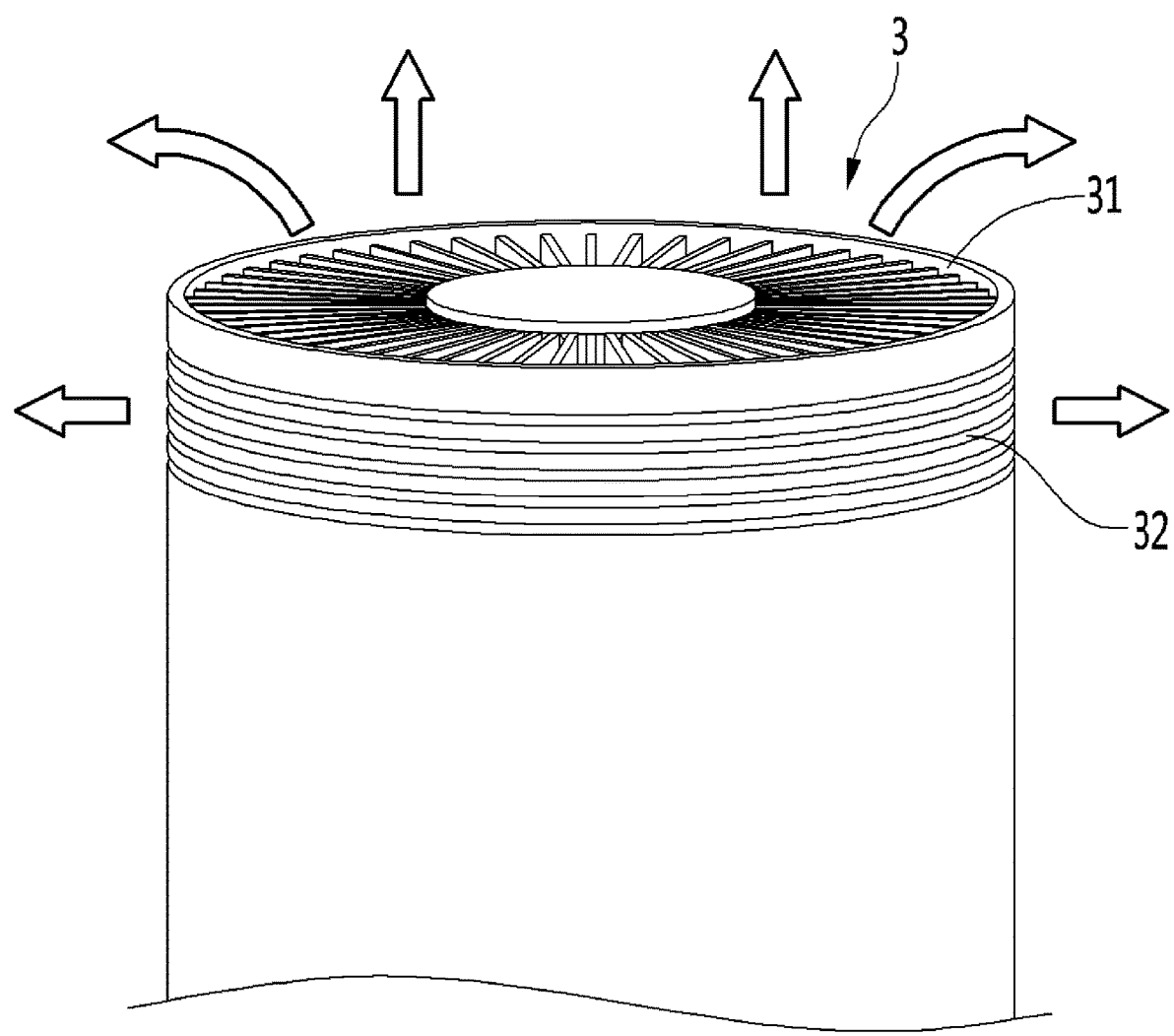
FIG. 14 shows an implementation of a discharging mode where both the side and the top of the upper discharge portion are opened.

Referring to FIG. 14, both the top and side discharge grills 31 and 32 are opened, and both indirect and direct air flow may be discharged. In addition, based on a height adjustment of the second case 20, air may also be discharged through the side discharge portion 4 (FIG. 1). A height of the second case 20 may be adjusted to control an air flow. In the power mode, clean air discharged from the side discharge grill 32 may flow toward a head of an adjacent user, and clean air discharged from the side discharge portion 4 may flow toward a trunk of an adjacent adult or a head of an adjacent child. In such a situation, the air discharged from the side discharge grill 32 may be direct upper air flow while air discharged from the side discharge portion 4 may be direct lower or middle air flow. In the normal mode, clean air discharged from the side discharge grill 32 may flow toward a trunk of an adjacent adult or a head of an adjacent child, and may be direct lower or middle air flow. In the power mode and the normal mode, the top discharge grill 31 may indirectly blow clean air to an entire space of the room.

Table 1 summarizes discharging or use modes of the air purifier 1 which may be implemented in the normal mode and the power mode by the top discharge grill 31, the side discharge grill 32, and the side discharge portion 4.

TABLE 1

|  | Top discharge grill 31 | Side discharge grill 32 | Side discharge portion 4 | Air Flow |
| --- | --- | --- | --- | --- |
| Normal mode | Open | Closed | Closed | Indirect air flow |
| Normal mode | Open | Open | Closed | Indirect air flow/ Direct air flow toward an adult trunk or child head |
| Normal mode | Closed | Opened | Closed | Direct air flow toward an adult trunk or child head |
| Power mode | Opened | Opened | Opened | Indirect air flow/ Direct air flow toward an adult trunk, child head, and adult head |
| Power mode | Opened | Closed | Opened | Indirect air flow/ Direct air flow toward an adult trunk or child head |
| Power mode | Closed | Opened | Opened | Direct air flow toward an adult trunk, child head, and adult head |
| Power mode | Closed | Closed | Opened | Direct air flow toward an adult trunk and child head |

Referring to Table 1, seven modes may be implemented in the normal mode or power mode. In addition, more modes may be implemented when the second case 20 is at various heights between an initial height in the normal mode or a maximum height in the power mode. As a height of the second case 20 increases, direct air flow from the side discharge portion 4 may decrease.

Dimensions of the air purifier (positions of the side discharge portion 4 and side discharge grill 32, a number of holes or a assize of holes of the side discharge portion 4, side discharge grill 32, and top discharge grill 31, etc.) may be sufficiently utilized so that a cleaning function of the air purifier 1 may address a whole area of a room or optional areas. Referring to Table 1, air in a middle height region of a room may be purified in the normal mode via the top discharge grill 31. In the power mode, more air may be suctioned and purified, and air in both middle and upper regions of the room may be purified. A user may switch between modes based on a preference, increasing satisfaction. Alternatively or in addition thereto, the air purifier 1 may include an optional air quality sensor or communicate with remote air quality sensors, and an operation of the air purifier 1 may be based on sensed air quality. For example, an opening and closing of the top discharge grill 31, an opening and closing of the side discharge grill 32, and a height of the second case 20 (and therefore a size of the side discharge portion 4) may be adjusted based on sensed air quality in an upper portion or lower portion of the room.

The side discharge portion 4 and the side discharge grill 32 may have similar heights but different functions based on sizes and shapes of their holes or openings. For example, the side discharge portion 4 may include a plurality of wider holes to create a larger or wider discharge area as compared with the side discharge grill 32, which may be thinner slits. A flow rate of air discharged through the side discharge portion 4 may be smaller or slower than a flow rate of air discharged through the side discharge grill 32. Air discharged through the side discharge portion 4 may be more indirect and disperse more than air discharged through the side discharge grill 32. The side discharge portion 4 may, for example, be used for elderly adults who might find direct air flow bothersome, and the side discharge grill 32 may be used for adults who want direct air.

A separate door similar to door 230 (FIG. 11) may be optionally provided to open and close the side discharge portion 4. When the separate door for the side discharge portion 4 is provided, more discharging modes may be implemented, as the side discharge portion 4 maybe closed in the power mode. As another alternative, the door 230 may be provided to open and close the side discharge portion 4 instead of the side discharge grill 32. In this case, an air cleaning function for a middle area of the room may be performed in the normal mode via the side discharge grill 3 and in the power mode via the side discharge portion 4. Air cleaning of middle and upper regions may be simultaneously performed in the power mode when both the upper discharge portion 3 and the side discharge portion 4 are opened.

As previously described, referring back to FIGS. 4 and 5, the filter 12 may be slideably removable from the filter frame 14 inside of the first case 10. The filter frame 14 and the LM guide assembly may be integrated to form a skeleton or support of the air purifier 1. However, to replace the filter 12, the second case 20 must be lifted upward, and the first case 10 must be removed. Alternatively, the first case 10 may include an optional door to open and close (e.g., an exterior of the first case 10 may be formed as a sliding door that is risen to expose the filter 12, similar to the door 230 in FIG. 5, or the first case 10 may be formed of two demi-cylindrical shells that hinge open and close after the first case 10 is removed from the air purifier 1 or if the second case 20 is able to be lifted off the first case 10 to a height that does not overlap with the first case 10).

The presence of the first case 10 may be an inconvenience for consumers in replacing the filter 12, and a separate service performer or installer may be required to remove the filter 12, as removal of the first case 10 and filter 12 may be difficult.

Figure 15:
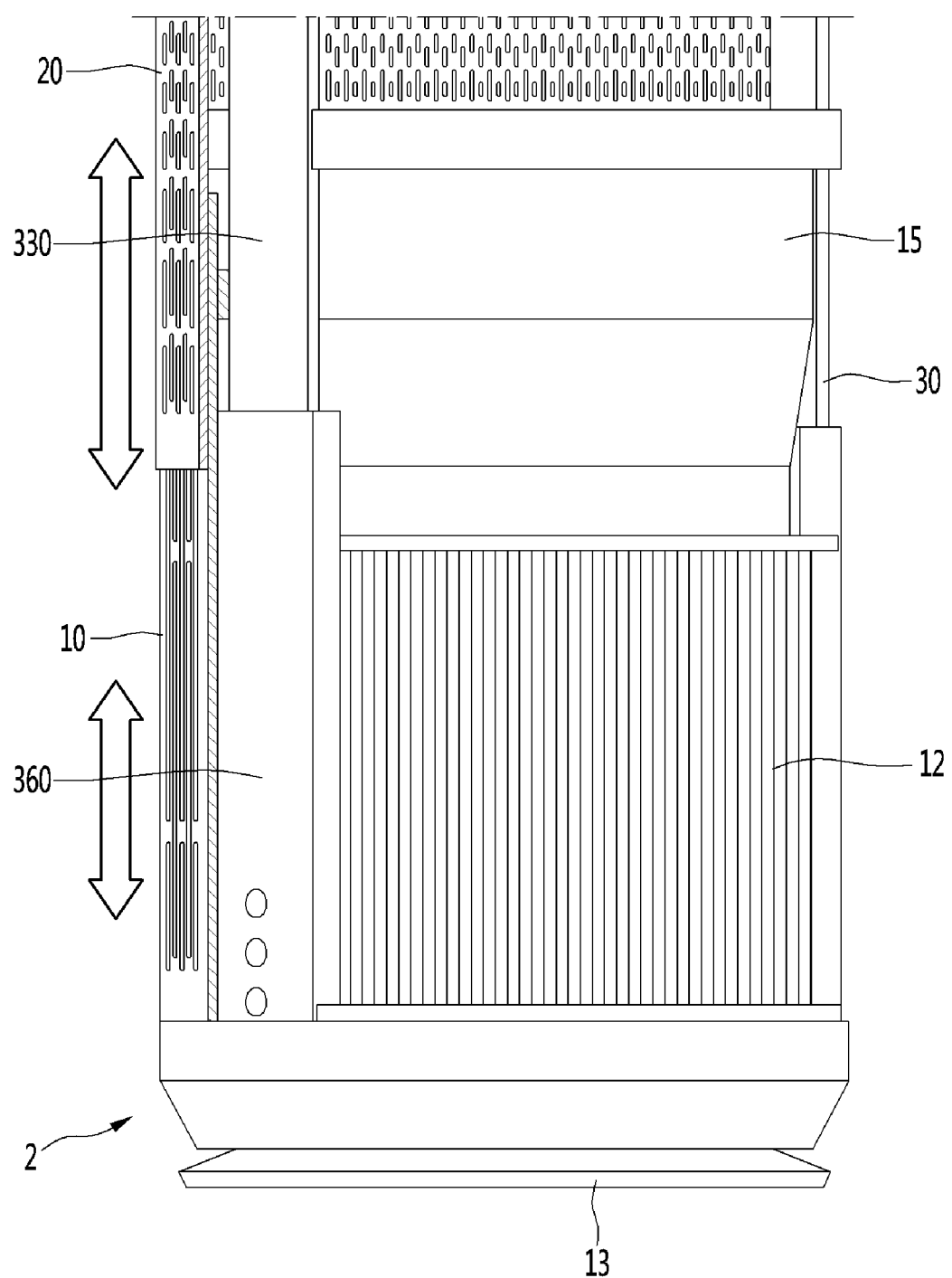
FIG. 15 is a view schematically showing an action of an LM guide according to another embodiment.
Figure 18:
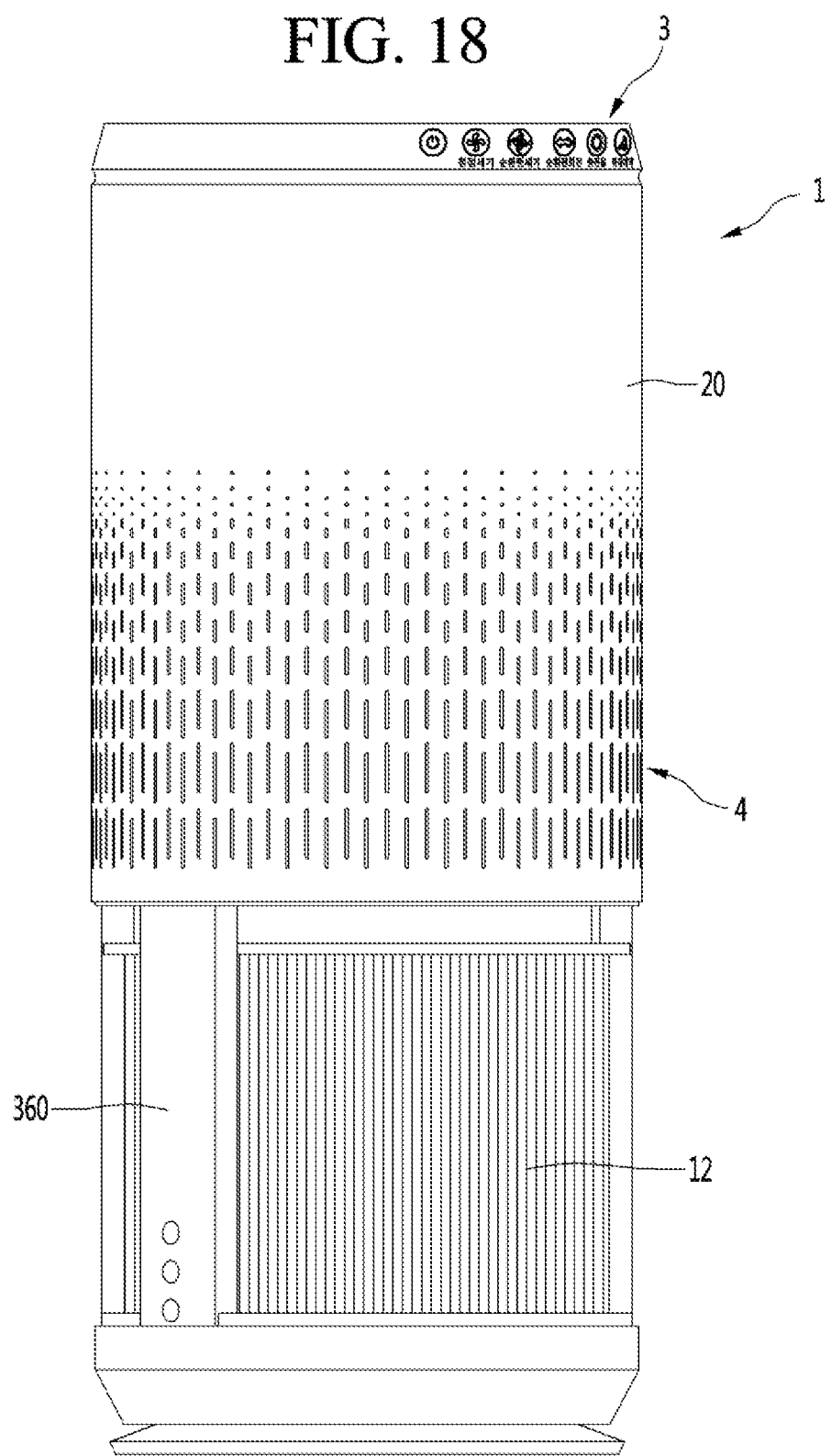
FIG. 18 is a view showing a state in which both the first case and the second case are raised up to expose a filter.

To solve such an inconvenience, referring to FIGS. 15 and 18, the first case 10 may also be configured to slide upward and downward, similar to how the second case 20 is moved, while the filter 12 may remain in a fixed position. When the first case 10 is lifted up, the filter 12 may be exposed. FIG. 18 shows a state in which both the first case 10 and the second case 20 are raised. In a state in which the case is automatically lifted, the filter 12 may be exposed to an outside. The user may conveniently take out the filter 12 and replace it with a new filter 12.

An LM guide assembly may be supported at a lower portion of the first case 10 and an upper portion of the second case 20 to perform an elevating action of the second case 20. The LM Guide assembly may include an intermediate member 330 to which the first case 10 may be fixed, and an inner member to which the filter frame 14 may be fixed. The intermediate member 330 may be configured to move up and down to move the first case 10 up and down with respect to the inner member 360. When the first case 10 is moved upward, the filter frame 14 may remain in a fixed position and the filter 12 may be exposed, and a separation and mounting of the filter 12 may be conveniently performed.

Figure 16:
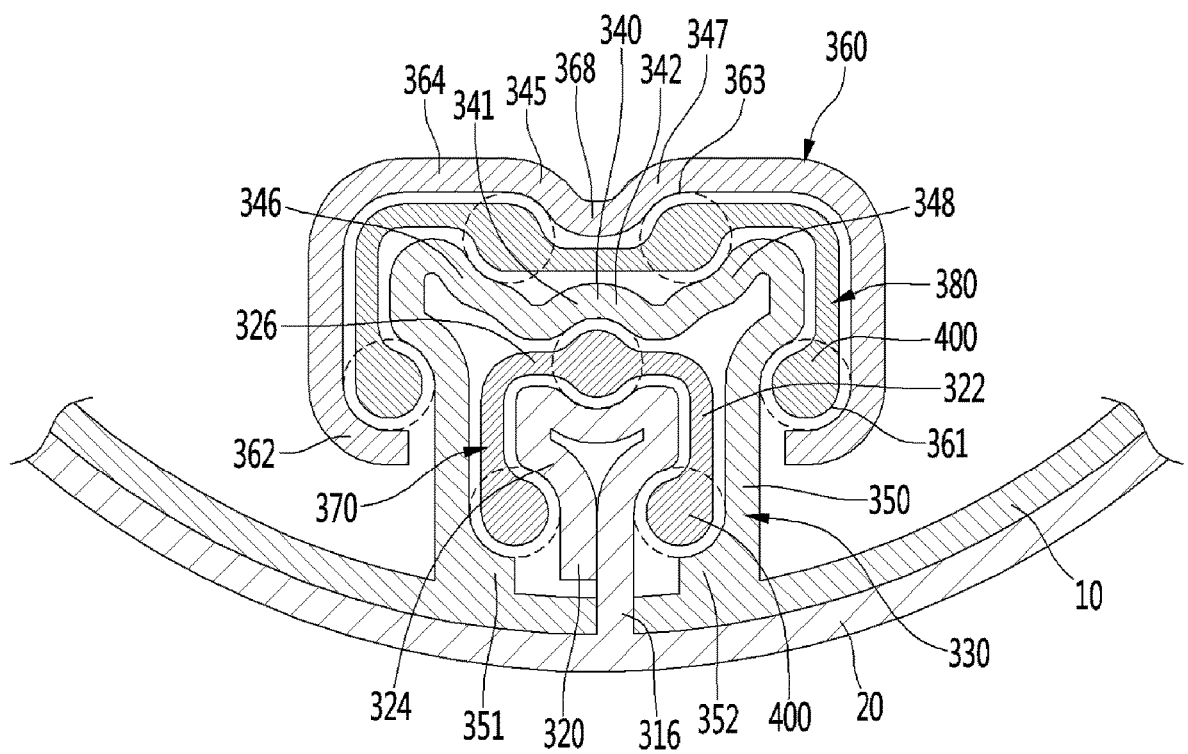
FIG. 16 is a cross-sectional view of the LM guide of FIG. 15 when viewed from above.
Figure 17:
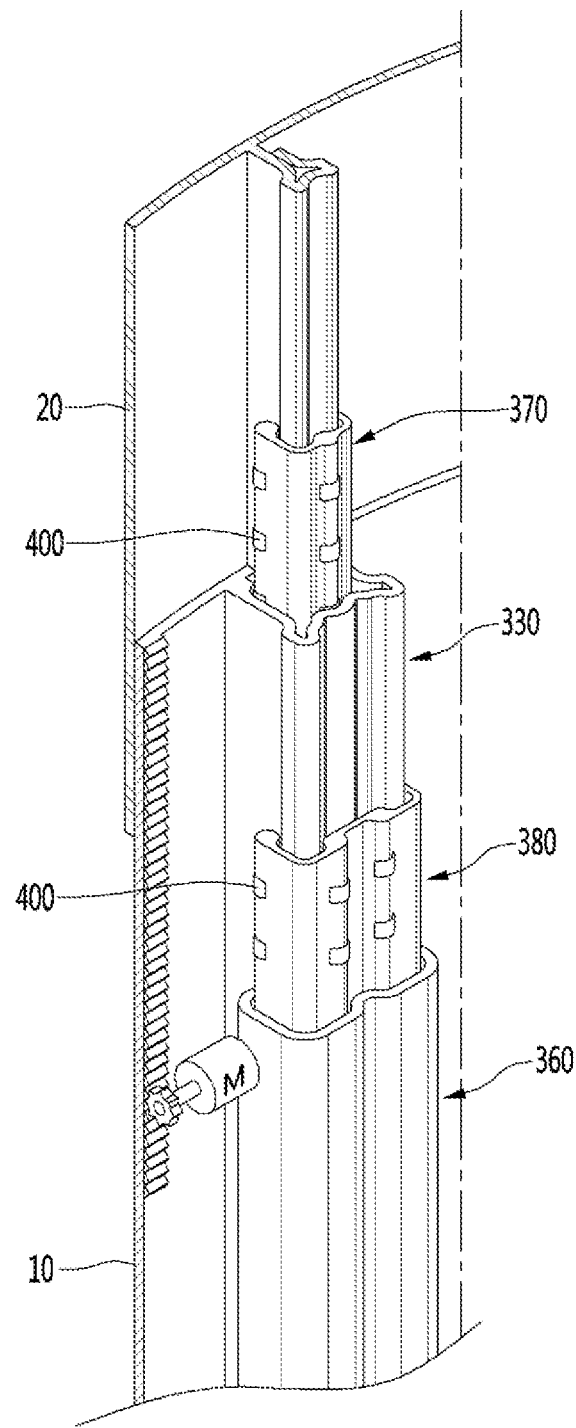
FIG. 17 is a perspective view of the LM guide of FIG. 15.

Referring to FIGS. 16 and 17, the LM guide assembly may include an outer member 310 coupled to the second case 20, the intermediate member 330 located on an inner side of the outer member 310 and fixed to the first case 10, and the inner member 360 fixed to the filter frame 14 (FIG. 3) located on an inner side of the intermediate member 330. The inner member 360 may be configured to surround an outer surface of the intermediate member 330, and the intermediate member 330 may be configured to surround an extension 316 or raceway portion 320 of the outer member 310. The inner member 360 may remain fixed, while the intermediate member 330 may slide relative to the inner member 360 to insert into and out of the inner member 360. The outer member 310 may slide with respect to the intermediate member 330 to insert into and out of the intermediate member 330.

The outer member 310 and inner member 360 are referred to as outer and inner members in this specification because the outer member 310 may be provided on an outermost side of the air purifier 1 to couple to the second case 20 while the inner member 360 may be coupled to the filter frame 14, which may be provided inside of the first case 10. However, when viewed from above in FIG. 16, the outer member 310 may also be referred to as an "inner member" while the inner member 360 may also be referred to as an "outer member" because the inner member 360 may surround the outer member 310 and have a larger cross-sectional area than the outer member 310.

The LM Guide assembly may also include a first or outer ball retainer or rail 370 provided between the outer member 310 and the intermediate member 330, and a second or inner ball retainer or rail 380 provided between the intermediate member 330 and the inner member 360. The first and second ball retainers 370 and 380 may also be referred to as first and second ball cages. The intermediate member 330 and the first case 10 may be raised and lowered while the inner member 360 is fixed to a bottom of the air purifier 1 and/or the filter frame 14. The outer member 310 and the second case 20 may be raised and lowered with respect to the intermediate member 330, which may remain stationary or may also be raised and lowered.

The second case 20 may move relative to the first case 10, and the first case 10 may move relative to the bottom of the air purifier 1 and the filter frame 14. When the first case 10 rises, the filter 12 may be exposed to be drawn in and out of the mounting space of the filter frame 14.

A plurality of balls or rounded portions 400 may be inserted into openings of the ball retainers 370 and 380 to be exposed toward an inner side. The balls 400 may be spaced apart from each other by a predetermined vertical and horizontal distance in the ball retainers 370 and 380. Balls 400 of the first ball retainer 370 may be inserted into grooves or spaces formed on an outer contour of the raceway portion 320 formed in the outer member 310. Balls 400 of the second ball retainer 380 may be inserted into grooves or spaces formed on an outer contour of the intermediate member 330. Here, "outer contour" may mean the outer surface of the outer and intermediate members that are visible in FIG. 17, even though such contours may substantially face an inner side or interior of the air purifier 1.

The first ball retainer 370 may slide relative to the outer member 320 and the second ball retainer 380 may slide relative to the intermediate member 330. The balls 400 of the first and second ball retainers 370 and 380 may slide along grooves or raceways formed in the outer and intermediate members 320 and 330, respectively. Since the balls 400 may be exposed to an outer side through openings in the first and second ball retainers 370 and 380, the first and second ball retainers 370 and 380 may also move smoothly with respect to the intermediate and inner members 330 and 360, respectively.

The outer member 310 may include a raceway portion 320 and an extension 316. The extension 316 may extend from the raceway portion 320 to couple to the second case 20. The raceway portion 320 may have a rounded, circular, or curved rectangular cross section, and an outer contour of the raceway portion 320 may form three raceways or grooves in which balls 400 of the first ball retainer 370 may glide along. When viewed from above in FIG. 16, the three raceways may be arranged so as to form vertices of an equilateral triangle. An upper end of the raceway portion 320 may include a stopper or projection to prevent the first ball retainer from coming off the outer member 310.

The intermediate member 330 may include a central portion 340 having a W-shaped or wing-shaped cross section configured to fit between the first and second ball retainers 370 and 380. A side edge portion or extension 350 may extend from ends of the central portion 340 to be integrally formed with the central portion 340. The intermediate member 330 may have a total of seven raceway portions or grooves formed on inner and outer sides to accommodate balls 400 exposed through the openings of the first and second ball retainers 370 and 380. Three raceway portions may be formed in the central portion 340 (two on a side facing the second ball retainer 380 and one facing the first ball retainer 370) while four raceway portions may be formed in the extension 350 (two on the side facing the second ball retainer 380 and two on the side facing the first ball retainer 370).

The inner member 360 may have a C-shaped cross-section having a central bend 368 formed in a straight portion 364. Four raceway portions or grooves may be formed on a side of the inner member 360 facing the second ball retainer 380 to accommodate balls 400 of the second ball retainer 380. The central bend 368 may be configured to bend toward the second ball retainer 380 and slide between balls 400 in a middle portion of the second ball retainer. The inner member 360 may be integrated with a component of the air purifier 1 or an interior of the first case 10 such as the filter frame 14.

In more detail, the central portion 340 of the intermediate member 330 may include side raceway portions 346 and 348 and a central raceway portion 342. The side raceway portions 346 and 348 may be formed on both side portions of the W-shaped cross section of the central portion 340 to accommodate balls of the second ball retainer 380. The central raceway f portion 342 may be formed on a central portion of the W-shaped cross section to accommodate balls 400 of the first ball retainer 370.

The inner member 360 may include central raceway portions 345 and 347 that are positioned to correspond to the side raceway portions 346 and 348 in the intermediate member 330. Central raceway portions 345 and 347 may be at sides of the central bent portion 368 and face the side raceway portions 346 and 348. Central raceway portion 345 and side raceway portion 346 may be configured in position and shape to accommodate balls 400 of the second ball retainer 380. Central raceway portion 347 and side raceway portion 348 may be configured in position and shape to accommodate balls of the second ball retainer 380.

The extension 350 of the intermediate member 330 may include first and second raceway portions 351 and 352 formed at end portions and facing the raceway portion 320 of the outer member. The raceway portion 320 may have a groove 324 positioned and shaped to face the first and second raceway portions 351 and 352 so that balls of the first ball retainer 370 may be accommodated between the first and second raceway portions 351 and 352 and the raceway portion 320.

The second ball retainer 380 may include a flange or stopper facing the intermediate member 330 to prevent the intermediate member 330 from sliding off of the second ball retainer 380. The second ball retainer 380 may also include a flange or stopper facing the inner member 360 to prevent sliding off the inner member 360.

The intermediate member 330 may slide with respect to the outer member 310 and the inner member 360. The outer member 310, the intermediate member 330, and the inner member 360 forming the LM guide may all move relative to each other via a sliding movement by the first ball retainer 370 and the second ball retainer 370.

The plurality of balls 400 inserted into the first and second ball retainers 370 and 380 may perform a rolling motion along the raceway portions 324, 342, 345-348, 351, 352, 361, and 362 formed on the respective members 310, 330, and 360. Accordingly, a sliding action between the inner, intermediate, and outer members 360, 330, and 310 may be performed smoothly. Various rails and stoppers may be formed in top or bottom edges of the inner, intermediate, and/or outer members 360, 330, and 310 and/or the first and/or second ball retainers 370 and 380 to prevent decoupling or sliding off.

A drive motor may be provided between the intermediate member 330 and the outer member 310 and/or the intermediate member 330 and the inner member 360 so that a movement of the outer, intermediate, and inner members 310, 330 and 360 may be automatically operated. As an example, the drive motor may work to lift the first case 10 and/or the second case 20 via a gear tooth method where a drive motor rotates a pinion that engages with a track. The rack may be provided on an inner surface of the first case 10 and the pinion may be provided on an upper end of an outer surface of the inner member 360. The pinion and rack method to lift the first case 10 may be the same as or similar to the method shown in FIG. 5 to lift the second case 20 and/or the method shown in FIG. 11 to lift the door 230. The drive motor may be provided at the upper end of the inner member 360 to turn the pinion that engages with the rack.

In order to avoid interference between the first and second cases 10 and 20, the rack and pinion for the second case 20 may be installed in a different LM guide assembly than the rack and pinion for the first case 10. Three LM guide assemblies may be provided, which are based on the inner, intermediate, and outer members 360, 330 and 310. The filter 12 may be pulled out through a gap or space formed, and may not interfere with the LM Guide assemblies during removal.

In order to secure a supporting force, angles between any set of two LM guide assemblies may be asymmetric. A space for installing a pair of LM guide assemblies may be larger than a space through which the filter 12 is drawn out. The filter 12 may be inserted and/or removed through a gap formed by the LM Guide assembly mounted at the largest angle compared with the other two LM Guide assemblies.

The second case 20 may be moved up and down with respect to the first case 10, and the first case 10 may be moved up and down with respect to the inner member 360. When the first case 10 is lifted up, the filter 12 inside the air purifier 1 may be visible, and may be conveniently drawn out and replaced.

This application is related to U.S. application Ser. No. 16/815,573 filed on Mar. 11, 2020 and 16/815,663 filed on Mar. 11, 2020, the entire contents of which are hereby incorporated by reference.

Embodiments disclosed herein may implement various discharging modes together in a single air purifier, improving satisfaction. Even in implementation of an individual or single mode, an indoor space may be purified quickly by making maximum use of specifications and/or dimensions of the air purifier, increasing an industrial applicability.

A cylindrical filter having a bottom surface may be used to increase an amount of air purified in a given time period, and the filter may be conveniently replaced by a user. According to embodiments disclosed herein, the user may directly replace a filter, which has not been available to users in the past. Embodiments disclosed herein may provide an air cleaner or purifier which may sufficiently utilize given resources of the air purifier to quickly purify indoor air. The air purifier may be capable of using both an upper part or case and a lower part or case as a discharging structure at the same time or simultaneously. The air purifier may supply clean air simultaneously to an entire area of an indoor space where the air purifier is placed to address the needs of various users. The air purifier may be adjusted to accommodate a user who does not want to be in direct contact with a discharged air flow stream, improving satisfaction.

Embodiments disclosed herein may be implemented as an air purifier or cleaner including a fan to suction outside air by applying negative pressure to a filter or filter member, a first case having a wall to receive at least a part of the fan and the filter member, the first case being movable in a first direction, and a second case capable of accommodating at least a part of the fan and the filter member, at least a part of which may be overlapped with the wall of the first case and which may be movable in the first direction. The length of the air purifier may be changed, whereby a height where clean air is discharged may be adjusted. The user may enjoy clean air in various states.

The filter member may be provided in a cylindrical shape having a bottom portion to increase a suction area of air. Outside air may be suctioned from a side or bottom through the filter member to an inside or interior of the filter member, thereby reducing a flow resistance of the air and providing a filter member with tight dusting intervals. In addition, since air may be suctioned in various directions, an air cleaning or purifying capability or capacity per unit time may be increased.

The first direction may be a vertical direction or a gravity direction, and the first case and the second case may extend in the vertical direction. Since an elongation may be adjusted up and down in the vertical direction, the air purifier may be adjusted based on a height of the user.

When the first case rises or is lifted, the filter member may be exposed to an outside so that the filter member may be conveniently used when the air purifier is used. The first case may be moved to an inside or interior of the second case to overlap to avoid interference between the first and second cases and any parts or components. The air purifier may include a linear motion (LM) guide that forms a skeleton of an air purifier and permits relative movement between at least two members so that the case may be smoothly moved or adjusted.

The LM guide may be provided between the first case and the second case to allow smooth linear motion between the first case and the second case. Two members relatively movable in the LM guide may be fastened to the first case and the second case, respectively, and may permit movement in which the two members are constrained in a fastened state.

The filter member may further include a filter frame to receive the filter member, and the weight of the air purifier may be supported using the filter member as a fulcrum. The LM guide may connect between the first case and the filter frame to allow relative movement of the first case and the filter frame. The first case, provided outside of the filter member, may be moved to expose the filter frame. The LM guide may be configured to expose a lower structure to an outside. The LM guide may connect the first case and the second case to allow relative movement of the first case and the second case. The LM guide may perform an action to lift the air purifier and to raise the first case when the filter member is replaced.

The LM guide may include at least two members capable of relative movement. At least one of the at least two members may be moved by a motor so that an operation of the exterior (i.e., the first or second case) is automatically driven, improving convenience.

The LM guide may include at least three members capable of relative movement, and at least two of the at least three members may be moved by a motor. The user may not need to put effort into an operation of the exterior of the air purifier and/or a height adjustment operation.

Three LM guides may be provided to provide a skeleton or frame and more safely support a weight of the air purifier. A mounting angle of the LM guide may be larger than that of the other two. The filter member may be separated and mounted through a large gap portion of the LM guide.

Embodiments disclosed herein may be implemented as an air cleaner including a fan to suction outside or ambient air by applying negative pressure to a filter member or assembly, a first case having a wall to receive the filter member and extending in a vertical direction, and a second case capable of receiving the fan and capable of overlapping with at least a part of the wall of the first case so as to be movable in the up and down direction. A length of the air purifier may be extended or adjusted, and a supply position of clean air may be changed in accordance with a user's preferences.

The filter member may include a cylindrical body corresponding to the first case and a bottom provided on a bottom of the cylindrical body and performing a filtering action. A suction area of the outside air may be increased so that more ambient air may be sucked and used for air cleaning or purifying, and ambient air of the room may be cleaned more quickly per unit area.

Since the first case may be moved in the vertical direction, a length of the air purifier may be controlled in the vertical direction, (i.e., the gravity direction). Clean air may be supplied to the user's current living standards, preferences, or at a height corresponding to the user's height. When the first case is moved upward, the filter member may be entirely exposed to the outside so that the user may conveniently replace the filter member.

An LM guide to guide the vertical movement of the first case inside (or alternatively, outside) the second case may be provided so that a linear movement of the first case may be conveniently controlled. The LM guide may guide a vertical movement of the second case so that a length of the air purifier and an opening of an outer wall for the filter member may be performed together by a single LM guide.

Embodiments disclosed herein may be implemented as an air cleaner or purifier including a fan to suction outside or ambient air by applying negative pressure to a filter member or assembly, a first case having a wall for receiving the filter member, the first case being movable in a first direction, and an LM guide to guide a movement of the first case. An opening of the filter member may be conveniently performed.

A motor may be included to operate the LM guide. A user of the air cleaner may conveniently replace the filter member so that a special operator is not required.

Embodiments disclosed herein may improve a structure of the air cleaner and use an entire case of the air cleaner as a suction structure and a discharge structure, improving fluidity of airflow and quickly cleaning an indoor space. Since a mode change of the air cleaner may improve a suction performance and increase a discharge area, an entire area around the air cleaner, regardless of an upper part and a lower part, may contribute to a performance of the air cleaner.

Since the air cleaner may be operated in various modes with respect to a region desired by the user with various discharging structures, the user's needs may be satisfied, and a variety of needs may be addressed. By providing a barrier structure, direct air flow and indirect airflow may be selected for each individual, improving satisfaction for individual users such as elderly people who are different from other users in the same space. A lifting structure may be extended to raise and lower the case as a whole, so that the filter member of the air cleaner may be conveniently replaced.

Embodiments disclosed herein may be implemented as an air purifier comprising a first case configured to move in a first direction between a first position and a second position, a fan covered by the first case in the first position and configured to suction ambient air, a filter covered by the first case in the first position and configured to filter foreign matter from suctioned air, and a second case configured to move in the first direction between a third position and a fourth position, the second case at least partially overlapping with the first case such that a length of overlap between the first and second cases changes when the first and second cases move relative to each other.

The filter may have a cylindrical shape having a side surface through which ambient air may be suctioned in a radial direction of the fan. The filter may have an end surface through which ambient may be suctioned in an axial direction of the fan.

The first direction may be a vertical direction. The first case and the second case may extend in the vertical direction. When the first case rises, the filter may be exposed.

The second case may have a larger cross-sectional area than the first case. The first case may be configured to insert into an interior of the second case.

A linear motion (LM) guide assembly may be configured to move at least one of the first case or the second case in the first direction. The LM guide assembly may include an outer LM guide provided between the first case and the second case such that the first and second case move relative to each other in the first direction via the LM guide assembly.

A filter frame in which the filter may be mounted may be provided. and The filter may be detached from the filter frame. The LM guide assembly may include an inner LM guide provided between the first case and the filter frame such that the first case moves relative to the filter frame in the first direction via the LM guide assembly.

The LM guide assembly may include an outer LM guide provided between the first case and the second case such that the first and second case move relative to each other in the first direction via the outer LM guide, an inner LM guide provided between the first case and the filter frame such that the first case moves relative to the filter frame in the first direction via the outer LM guide, and at least one motor to drive at least one of the inner or outer LM guides.

The LM guide assembly may include an inner member fixed to at least one of a filter frame in which the filter may be provided or a fan housing in which the fan may be provided, an intermediate member fixed to the first case and configured to slide into and out of the inner member, an outer member fixed to the second case and configured to slide into and out of the intermediate member, and at least one motor to drive at least one of the outer or intermediate members.

Embodiments disclosed herein may be implemented as an air purifier including a first case extending in a vertical direction, a second case at least partially overlapping the first case and configured to move in the vertical direction to change a length of overlap between the first and second cases, a filter configured to filter foreign matter from suctioned air, the filter having a cylindrical body and a bottom portion provided at the bottom end of the cylindrical body, and a fan configured to suction air through the cylindrical body and the bottom portion of the filter.

The first case may be configured to move relative to the filter in the vertical direction such that, when the first case may be moved upward, the filter may be exposed.

A linear motion (LM) guide assembly may be provided inside the first case to guide a vertical movement of the first case. An LM guide assembly may guide a vertical movement of the second case.

The first case may include a bottom suction portion through which air may be suctioned upward toward the bottom portion of the filter, and a plurality of first through holes formed a side surface through which air may be suctioned radially toward the cylindrical body of the filter.

The second case may include a plurality of second through holes formed on a lower side surface, a side discharge grill having a plurality of slits formed on an upper side surface, and a top discharge grill formed in a top surface of the second case through which filtered air may be discharged. When the second case is lowered, the plurality of first and second through holes may overlap each other such that air may be suctioned through the plurality of first and second through holes. When the second case is raised, the plurality of first and second through holes may not overlap each other such that air may be suctioned through the plurality of first through holes and discharged through at least one of the plurality of second through holes, the side discharge grill, or the top discharge grill.

A wing device may be provided inside of the second case to open and close the top discharge grill. A door may be provided inside of the second case to open and close the side discharge grill.

Embodiments disclosed herein may be implemented as an air purifier comprising a filter configured to filter foreign matter from air, a fan configured to suction ambient air through the filter, a first case configured to move in an axial direction of the fan, a plurality of rails to guide a movement of the first case in the axial direction of the fan to cover the filter or expose the filter based on the movement of the first case, and a motor to move at least one of the rails relative to another rail.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air purifier, comprising:
    a first case configured to move in a first direction between a first position and a second position;
    a fan covered by the first case in the first position and configured to suction ambient air;
    a filter covered by the first case in the first position and configured to filter foreign matter from suctioned air; and
    a second case configured to move in the first direction between a third position and a fourth position, the second case at least partially overlapping with the first case such that a length of overlap between the first and second cases changes when the first and second cases move relative to each other.

2. The air purifier of claim 1, wherein the filter has a cylindrical shape having a side surface through which ambient air is suctioned in a radial direction of the fan and an end surface through which ambient is suctioned in an axial direction of the fan.

3. The air purifier of claim 1, wherein the first direction is a vertical direction, and the first case and the second case extend in the vertical direction.

4. The air purifier of claim 3, wherein, when the first case rises, the filter is exposed.

5. The air purifier of claim 1, wherein the second case has a larger cross-sectional area than the first case, and the first case is configured to insert into an interior of the second case.

6. The air purifier of claim 1, further comprising a linear motion (LM) guide assembly configured to move at least one of the first case or the second case in the first direction.

7. The air purifier of claim 6, wherein the LM guide assembly includes an outer LM guide provided between the first case and the second case such that the first and second case move relative to each other in the first direction via the LM guide assembly.

8. The air purifier of claim 6, further comprising a filter frame in which the filter is mounted and from which the filter is detached.

9. The air purifier of claim 8, wherein the LM guide assembly includes an inner LM guide provided between the first case and the filter frame such that the first case moves relative to the filter frame in the first direction via the LM guide assembly.

10. The air purifier of claim 6, wherein the LM guide assembly includes:
    an outer LM guide provided between the first case and the second case such that the first and second case move relative to each other in the first direction via the outer LM guide;
    an inner LM guide provided between the first case and the filter frame such that the first case moves relative to the filter frame in the first direction via the outer LM guide; and
    at least one motor to drive at least one of the inner or outer LM guides.

11. The air purifier of claim 6, wherein the LM guide assembly includes:
    an inner member fixed to at least one of a filter frame in which the filter is provided or a fan housing in which the fan is provided;
    an intermediate member fixed to the first case and configured to slide into and out of the inner member;
    an outer member fixed to the second case and configured to slide into and out of the intermediate member; and
    at least one motor to drive at least one of the outer or intermediate members.

12. An air purifier, comprising:
    a first case extending in a vertical direction;
    a second case at least partially overlapping the first case and configured to move in the vertical direction to change a length of overlap between the first and second cases;
    a filter configured to filter foreign matter from suctioned air, the filter having a cylindrical body and a bottom portion provided at the bottom end of the cylindrical body;
    and a fan configured to suction air through the cylindrical body and the bottom portion of the filter,
    wherein the first case is configured to move relative to the filter in the vertical direction such that, when the first case is moved upward, the filter is exposed.

13. The air purifier of claim 12, further comprising a linear motion (LM) guide assembly provided inside the first case to guide a vertical movement of the first case.

14. The air purifier of claim 12, further comprising an LM guide assembly to guide a vertical movement of the second case.

15. An air purifier, comprising:
    a first case extending in a vertical direction;
    a second case at least partially overlapping the first case and configured to move in the vertical direction to change a length of overlap between the first and second cases;
    a filter configured to filter foreign matter from suctioned air, the filter having a cylindrical body and a bottom portion provided at the bottom end of the cylindrical body; and
    a fan configured to suction air through the cylindrical body and the bottom portion of the filter,
    wherein the first case includes:
        a bottom suction portion through which air is suctioned upward toward the bottom portion of the filter; and a plurality of first through holes formed a side surface through which air is suctioned radially toward the cylindrical body of the filter.

16. The air purifier of claim 15, wherein the second case includes:
    a plurality of second through holes formed on a lower side surface;
    a side discharge grill having a plurality of slits formed on an upper side surface; and
    a top discharge grill formed in a top surface of the second case through which filtered air is discharged, wherein:
        when the second case is lowered, the plurality of first and second through holes overlap each other such that air is suctioned through the plurality of first and second through holes, and
        when the second case is raised, the plurality of first and second through holes do not overlap each other such that air is suctioned through the plurality of first through holes and discharged through at least one of the plurality of second through holes, the side discharge grill, or the top discharge grill.

17. The air purifier of claim 16, wherein a wing device is provided inside of the second case to open and close the top discharge grill.

18. The air purifier of claim 16, wherein a door is provided inside of the second case to open and close the side discharge grill.

19. An air purifier, comprising:
    a filter configured to filter foreign matter from air;
    a fan configured to suction ambient air through the filter;
    a first case configured to move in an axial direction of the fan;
    a plurality of rails to guide a movement of the first case in the axial direction of the fan to cover the filter or expose the filter based on the movement of the first case; and
    a motor to move at least one of the rails relative to another rail, and
    wherein the filter is exposed entirely to the outside when the first case is moved to an end of the axial direction of the fan and
    wherein the first case has a plurality of first through holes formed at a side surface through which air is suctioned toward the filter.

* * * * *